US011912027B2

(12) United States Patent
Park et al.

(10) Patent No.: US 11,912,027 B2
(45) Date of Patent: Feb. 27, 2024

(54) INKJET PRINTING APPARATUS

(71) Applicant: Samsung Display Co., LTD., Yongin-si (KR)

(72) Inventors: Sung Ho Park, Cheonan-si (KR); Kyong Sub Kim, Hwaseong-si (KR); Jae Won Choi, Cheonan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/830,796

(22) Filed: Jun. 2, 2022

(65) Prior Publication Data

US 2022/0396073 A1 Dec. 15, 2022

(30) Foreign Application Priority Data

Jun. 14, 2021 (KR) ........................ 10-2021-0076486

(51) Int. Cl.
*B41J 2/06* (2006.01)
*B41J 2/165* (2006.01)

(52) U.S. Cl.
CPC ............ *B41J 2/06* (2013.01); *B41J 2/16517* (2013.01); *B41J 2002/061* (2013.01); *B41J 2002/16561* (2013.01)

(58) Field of Classification Search
CPC . B41J 2/06; B41J 2/045; B41J 2/14201; B41J 2/16517; B41J 2/165; B41J 2/1433; B41J 2002/061; B41J 2002/16561; B41J 2002/14403
See application file for complete search history.

(56) References Cited

U.S. PATENT DOCUMENTS

| | | | |
|---|---|---|---|
| 6,312,110 B1 | 11/2001 | Darty | |
| 2022/0161566 A1 | 5/2022 | Park et al. | |

FOREIGN PATENT DOCUMENTS

| | | |
|---|---|---|
| JP | 2005-288915 | 10/2005 |
| JP | 2011-62592 | 3/2011 |
| JP | 2014-144431 | 8/2014 |
| KR | 10-2022-0070142 | 5/2022 |
| WO | 2021/015385 | 1/2021 |

OTHER PUBLICATIONS

Extended European search report for European Patent Application or Patent No. 22179018.1 dated Oct. 12, 2022.

*Primary Examiner* — Kristal Feggins
(74) *Attorney, Agent, or Firm* — KILE PARK REED & HOUTTEMAN PLLC

(57) ABSTRACT

An inkjet printing apparatus includes a stage on which a target substrate is mounted, and an inkjet head positioned above the stage, wherein the inkjet head includes an ejection part including a plurality of nozzles that spray ink containing a plurality of particles, a filter part disposed above the ejection part, and selectively passing the plurality of particles, and an electric field generating electrode that is disposed in the filter part and generates an electric field in the filter part.

17 Claims, 16 Drawing Sheets

INKJET PRINTING APPARATUS

CROSS-REFERENCE TO RELATED APPLICATION(S)

This application claims priority to and benefits of Korean Patent Application No. 10-2021-0076486 under 35 U.S.C. § 119, filed in the Korean Intellectual Property Office (KIPO) on Jun. 14, 2021, the entire contents of which are incorporated herein by reference.

BACKGROUND

1. Technical Field

The disclosure relates to an inkjet printing apparatus.

2. Description of the Related Art

The importance of display devices has steadily increased with the development of multimedia technology. In response thereto, various types of display devices such as an organic light emitting display (OLED), a liquid crystal display (LCD) and the like have been used.

A display device is a device for displaying an image, and includes a display panel, such as an organic light emitting display panel or a liquid crystal display panel. The light emitting display panel may include light emitting elements (e.g., light emitting diodes (LED)). Examples of the light emitting diode include an organic light emitting diode (OLED) using an organic material as a light emitting material and an inorganic light emitting diode using an inorganic material as a light emitting material.

An inkjet printing apparatus has been used to form an organic layer in a display device or align an inorganic light emitting diode. After an ink or solution is inkjet-printed, a post treatment process is performed to transfer the inorganic light emitting diode element or form an organic layer. The inkjet printing apparatus performs a process of supplying an ink or solution to an inkjet head and a process of spraying the ink or the solution onto a substrate (e.g., a target substrate) using the inkjet head.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Aspects of the disclosure provide an inkjet printing apparatus for preventing clogging of a nozzle due to precipitation of particles in an ink remaining in an inkjet head during a non-spray mode (printing waiting time).

However, aspects of the disclosure are not restricted to the one set forth herein. The above and other aspects of the disclosure will become more apparent to one of ordinary skill in the art to which the disclosure pertains by referencing the detailed description of the disclosure given below.

According to an embodiment of the disclosure, there is provided an inkjet printing apparatus including: a stage on which a target substrate is mounted; and an inkjet head positioned above the stage, wherein the inkjet head includes: an ejection part including a plurality of nozzles that spray ink containing a plurality of particles; a filter part disposed above the ejection part, and selectively passing the plurality of particles; and an electric field generating electrode that is disposed in the filter part and generates an electric field in the filter part.

According to another embodiment of the disclosure, there is provided an inkjet printing apparatus including: a stage on which a target substrate is mounted; and an inkjet head positioned above the stage, wherein the inkjet head includes: a plurality of nozzles that spray ink containing a plurality of particles, a first electrode filter disposed above the plurality of nozzles and including a plurality of first holes, and a second electrode filter disposed above the first electrode filter and overlapping the first electrode filter in a plan view, the second electrode filter including a plurality of second holes.

In accordance with the inkjet printing apparatus according to an embodiment, the inkjet head may include an inner tube, a plurality of nozzles disposed below the inner tube, and a filter part positioned between the plurality of nozzles and the inner tube. An electric field generating electrode may be disposed in the filter part. The electric field generating electrode may generate an electric field in the inkjet head in the non-spray mode, and may guide a flow of an ink remaining in the inkjet head by the electric field. Therefore, in the non-spray mode, the electric field generating electrode and/or the filter part may prevent particles in the ink remaining in the inkjet head from settling or precipitating downward in the inkjet head, and prevent clogging of the nozzle.

However, the effects of the disclosure are not limited to the aforementioned effects, and various other effects are included in the specification.

BRIEF DESCRIPTION OF THE DRAWINGS

An additional appreciation according to the embodiments of the disclosure will become more apparent by describing in detail embodiments thereof with reference to the accompanying drawings, wherein.

DETAILED DESCRIPTION OF THE EMBODIMENTS

Figure 1:
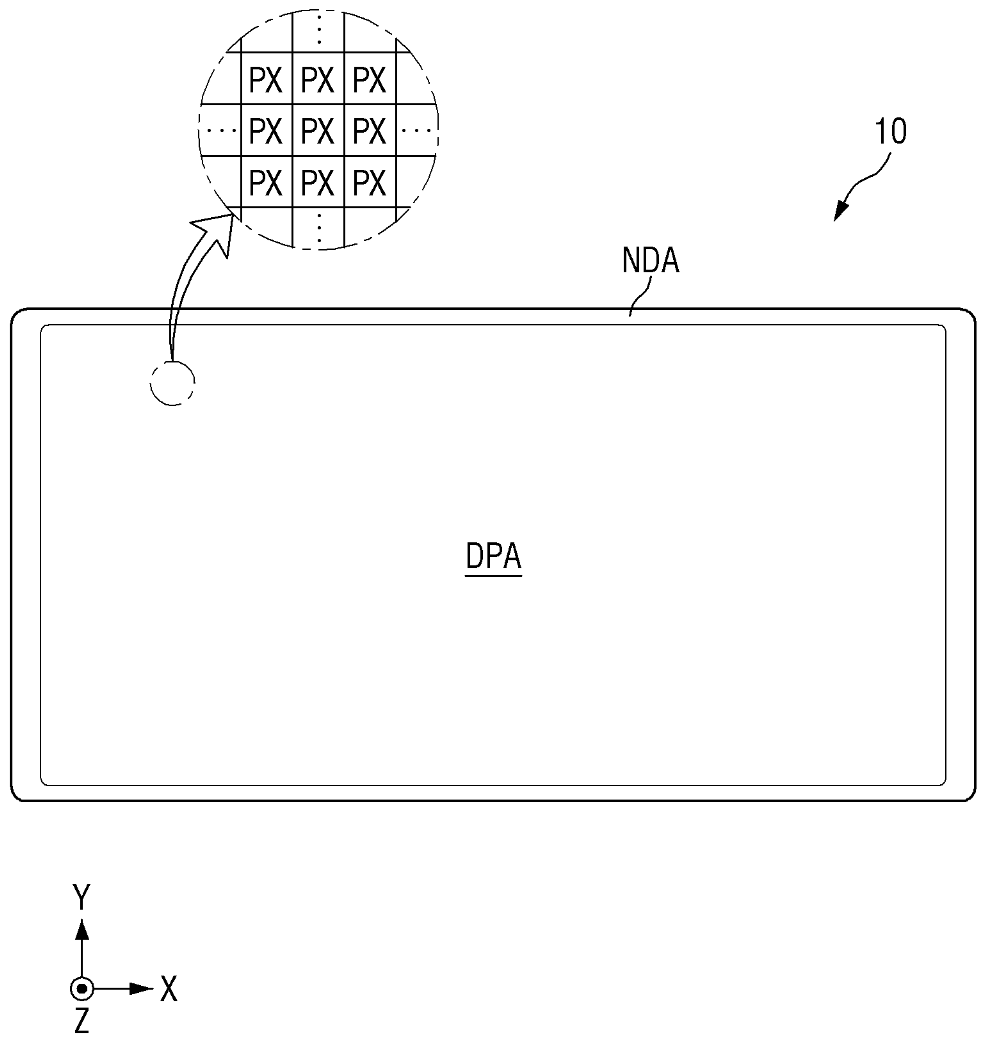
FIG. 1 is a schematic plan view of a display device according to an embodiment.

Embodiments of the invention will be described hereinafter with reference to the accompanying drawings. Although the embodiments may be modified in various manners and have additional embodiments, embodiments are illustrated in the accompanying drawings and will be mainly described in the specification. However, the scope of the disclosure is not limited to the embodiments in the accompanying drawings and the specification and should be construed as including all the changes, equivalents and substitutions included in the spirit and scope of the disclosure.

In the drawings, sizes and thicknesses of elements may be enlarged for clarity and ease of description thereof. However, the disclosure is not limited to the illustrated sizes and thicknesses. In the drawings, the thicknesses of layers, films, panels, regions, and other elements may be exaggerated for clarity. In the drawings, for better understanding and ease of description, the thicknesses of some layers and areas may be exaggerated.

Further, in the specification, the phrase "in a plan view" means when an object portion is viewed from above, and the phrase "in a cross-sectional view" means when a cross-section taken by vertically cutting an object portion is viewed from the side.

When a layer, film, region, substrate, or area, is referred to as being "on" another layer, film, region, substrate, or area, it may be directly on the other layer, film, region, substrate, or area, or intervening layers, films, regions, substrate, or areas, may also be present therebetween. Conversely, when a layer, film, region, substrate, or area, is referred to as being "directly on" another layer, film, region, substrate, or area, intervening layers, films, regions, substrates, or areas, may be absent therebetween. Further when a layer, film, region, substrate, or area, is referred to as being "below" another layer, film, region, substrate, or area, it may be directly below the other layer, film, region, substrate, or area, or intervening layers, films, regions, substrates, or areas, may be present therebetween. Conversely, when a layer, film, region, substrate, or area, is referred to as being "directly below" another layer, film, region, substrate, or area, intervening layers, films, regions, substrates, or areas, may be absent therebetween. Further, "over" or "on" may include positioning on or below an object and does not necessarily imply a direction based upon gravity.

The spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

Throughout the specification, when an element is referred to as being "connected" to another element, the element may be "directly connected" to another element, or "electrically connected" to another element with one or more intervening elements interposed therebetween. It will be further understood that when the terms "comprises," "comprising," "includes" and/or "including" are used in this specification, they or it may specify the presence of stated features, integers, steps, operations, elements and/or components, but do not preclude the presence or addition of other features, integers, steps, operations, elements, components, and/or any combination thereof.

It will be understood that, although the terms "first," "second," "third," or the like may be used herein to describe various elements, these elements should not be limited by these terms. These terms are used to distinguish one element from another element or for the convenience of description and explanation thereof. For example, when "a first element" is discussed in the description, it may be termed "a second element" or "a third element," and "a second element" and "a third element" may be termed in a similar manner without departing from the teachings herein. For example, a first color filter may be any one of a red, green, or blue color filter. A second color filter may be any one of a red, green, or blue color filter. A third color filter may be any one of a red, green, or blue color filter. First and second with respect to the light blocking members may be used interchangeably in the specification.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 80%, 5% of the stated value.

Some of the parts which are not associated with the description may not be provided in order to describe embodiments of the invention and like reference numbers refer to like elements throughout the specification.

In the specification and the claims, the phrase "at least one of" is intended to include the meaning of "at least one selected from the group of" for the purpose of its meaning and interpretation. For example, "at least one of A and B" may be understood to mean "A, B, or A and B."

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the specification.

FIG. 1 is a schematic plan view of a display device according to an embodiment.

Referring to FIG. 1, a display device 10 may display a moving image or a still image. The display device 10 may refer to any electronic device providing a display screen. Examples of the display device 10 may include a television, a laptop computer, a monitor, a billboard, an Internet-of-Things device, a mobile phone, a smartphone, a tablet personal computer (PC), an electronic watch, a smart watch, a watch phone, a head-mounted display, a mobile communication terminal, an electronic notebook, an electronic book, a portable multimedia player (PMP), a navigation device, a game machine, a digital camera, a camcorder, or the like, which provide (or include) a display screen.

The display device 10 may include a display panel which provides a display screen. Examples of the display panel may include an inorganic light emitting diode display panel, an organic light emitting display panel, a quantum dot light emitting display panel, a plasma display panel, a field emission display panel, or the like. Description of the inorganic light emitting diode display panel applied to the display panel is provided below with reference to the drawings, but the disclosure is not limited thereto, and other display panels may be applied within the same scope of technical spirit.

Hereinafter, in the drawings illustrating the display device 10, an X-axis direction X, a Y-axis direction Y, and a Z-axis direction Z are defined. The X-axis direction X and the Y-axis direction Y may be directions perpendicular to each other in a plane (or in a plan view). The Z-axis direction Z may be a direction perpendicular to the plane on which the X-axis direction X and the Y-axis direction Y are located. The Z-axis direction Z may be perpendicular to each of the X-axis direction X and the Y-axis direction Y. In the embodiment of the display device 10, the Z-axis direction Z may indicate (or mean) a thickness direction of the display device 10.

The display device 10 may have a rectangular shape including long and short sides such that the side in the X-axis direction X is longer than the side in the Y-axis direction Y in a plan view. A corner portion of the display device 10, in which the long side and the short side of the display device 10 meet, may be right-angled in a plan view. However, the disclosure is not limited thereto, and the corner portion of the display device 10 may be rounded, and have a curved shape. The shape of the display device 10 is not limited to the illustrated one and may be variously modified. For example, the display device 10 may have other shapes such as a square shape, a quadrilateral shape with rounded corners (or vertices), other polygonal shapes, or a circular shape in a plan view.

A display surface of the display device 10 may be disposed on a side in the Z-axis direction Z which is the thickness direction. In the description of the display device 10 of the embodiments, unless otherwise stated, the term "upward" refers to a side of the Z-axis direction Z, which is a display direction, and the term "top surface" refers to a surface toward a side of the Z-axis direction Z. The term "downward" refers to another side of the Z-axis direction Z, which is an opposite direction to the display direction, and the term "bottom surface" refers to a surface toward another side of the Z-axis direction Z. "left", "right", "upper" and "lower" indicate directions in case that the display device 10 is viewed from above (or in a plan view). For example, "right side" indicates a side of the X-axis direction X, "left side" indicates another side of the X-axis direction X, "upper side" indicates a side of the Y-axis direction Y, and "lower side" indicates another side of the Y-axis direction Y.

The display device 10 may include a display area DPA and a non-display area NDA. The display area DPA may be an area where a screen may be displayed, and the non-display area NDA is an area where the screen is not displayed. A light emitting element ED (e.g., refer to FIG. 2) may be disposed in the display area DPA during a manufacturing process of the display device 10 using an inkjet printing apparatus 1000 (refer to FIG. 6), which is provided below with reference to the drawings.

A shape of the display area DPA may follow (e.g., the same as or similar to) the shape of the display device 10. For example, the display area DPA may have a rectangular shape similar to the overall shape of the display device 10 in a plan view. The display area DPA may substantially occupy (or be disposed on) a center of the display device 10.

The display area DPA may include pixels PX. The pixels PX may be arranged in a matrix. A shape of each pixel PX may be a rectangular or square shape in a plan view. Each pixel PX may include a light emitting element made of inorganic particles. The light emitting element may be disposed in each pixel PX by an inkjet printing process using an inkjet printing apparatus 1000 (e.g., refer to FIG. 6).

The non-display area NDA may be disposed around the display area DPA. The non-display area NDA may completely or partially surround the display area DPA. The non-display area NDA may form a bezel of the display device 10.

Figure 2:
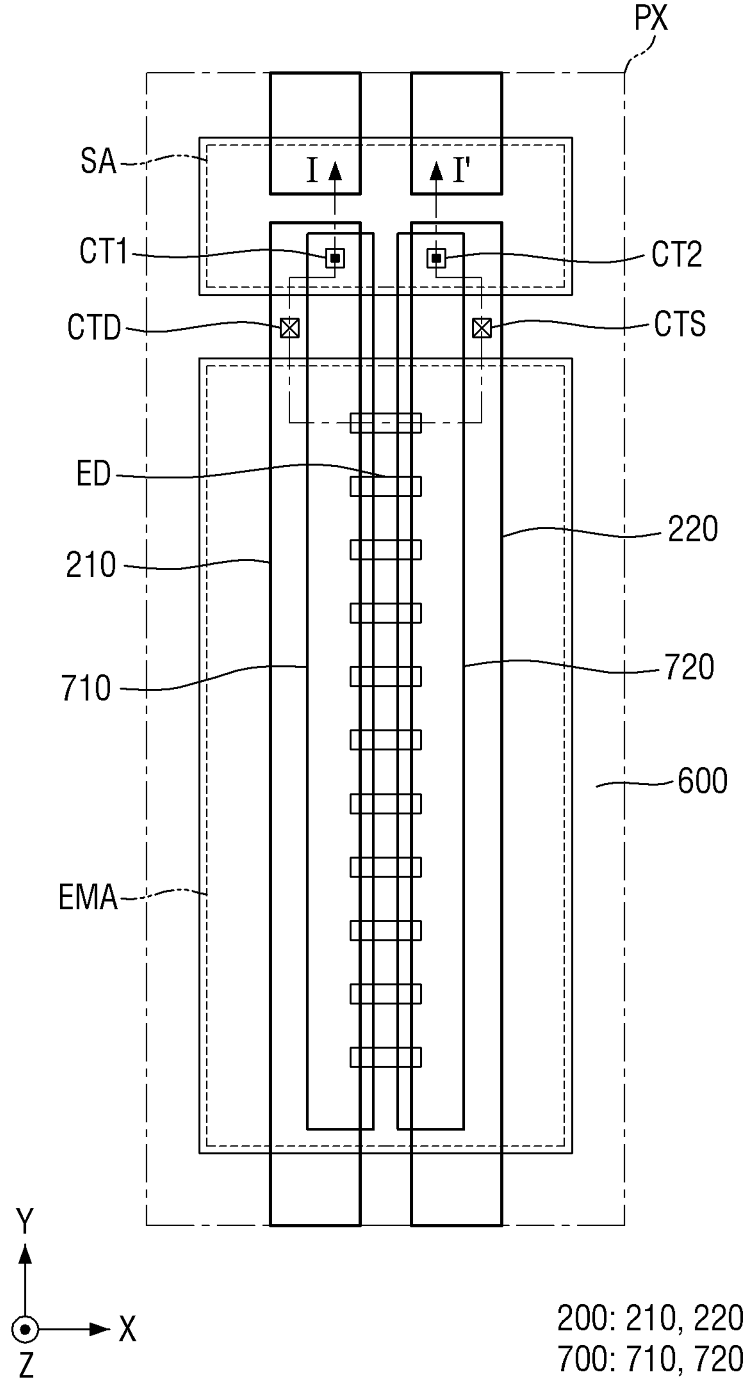
FIG. 2 is a schematic plan view illustrating a pixel of a display device according to an embodiment.

FIG. 2 is a schematic plan view illustrating a pixel of a display device according to an embodiment.

Referring to FIG. 2, each pixel PX of the display device 10 (refer to FIG. 1) may include an emission area EMA and a non-emission area. The emission area EMA may be defined as an area through which light emitted from a light emitting element ED is emitted. The non-emission area may be defined as an area in which the light is not emitted, and the light emitted from the light emitting element ED may not reach the non-emission area.

The emission area EMA may include an area in which the light emitting element ED is disposed and an area adjacent thereto. The emission area EMA may further include a region in which the light emitted from the light emitting element ED is reflected or refracted by another member and emitted.

Each pixel PX may further include a sub-region SA disposed in the non-emission area. The light emitting element ED may not be provided in (or disposed on) the sub-region SA. The sub-region SA may be disposed on an upper side (or side in Y-axis direction Y) from the emission area EMA within the pixel PX. The sub-region SA may be disposed between the emission areas EMA of the pixel PX and an emission area EMA of another pixel PX adjacent to each other in the Y-axis direction Y. For example, the sub-region SA may be disposed between adjacent ones of the emission areas EMA of adjacent pixels PX in the Y-axis direction Y. An electrode layer 200 and a contact electrode 700 may be electrically connected to each other through first and second contact portions CT1 and CT2 in the sub-region SA. Descriptions of the electrode layer 200 and the contact electrode 700 are provided below with reference to the drawings.

The sub-region SA may include a separation portion ROP. First electrodes 210 and second electrodes 220 of the electrode layers 200 included in the adjacent ones of the pixels PX adjacent to each other in the Y-axis direction Y may be separated from each other at or by the separation portion ROP of the sub-region SA.

The display device 10 may include a first bank 400, the electrode layer 200, the contact electrode 700, multiple light emitting elements ED, and a second bank 600.

The electrode layer 200 may be disposed across the emission area EMA and the sub-region SA. For example, a portion of the electrode layer 200 may be disposed in the emission area EMA, and another portion of the electrode layer 200 may be disposed in the sub-region SA. The electrode layer 200 may include multiple electrodes extending in the Y-axis direction Y and spaced apart from each other in the X-axis direction X. For example, the electrode layer 200 may include a first electrode 210 and a second electrode 220, which extend in the Y-axis direction Y and are spaced apart from each other in the X-axis direction X.

The first electrode 210 and the second electrode 220 may be disposed across the emission area EMA and the sub-region SA of each pixel PX. The first electrode 210 and the second electrode 220 of the pixel PX may be respectively spaced apart from another first electrode 210 and another second electrode 220 included in the pixel X adjacent in the Y-axis direction Y by the separation portion ROP positioned in the sub-region SA. For example, the separation portion ROP may be disposed between the first electrodes 210 of adjacent ones of the pixels PX in the Y-axis direction. The separation portion ROP may be disposed between the second electrodes 220 of the adjacent ones of the pixels PX in the Y-axis direction.

The first electrode 210 and the second electrode 220 separated by the separation portion ROP of each pixel PX may be formed after a process of aligning the light emitting elements ED during the manufacturing process of the display device 10. For example, in the process of aligning the light emitting elements ED during the manufacturing process of the display device 10, an electric field may be generated using alignment lines extending in the Y-axis direction Y, and the light emitting elements ED may be aligned by a dielectrophoretic force generated by the electric field generated between the alignment lines. After the process of aligning the light emitting elements ED is performed, the alignment lines may be separated by the separation portion ROP located in the sub-region SA of each pixel PX, and the first electrode 210 and the second electrode 220 separated by the separation portion ROP of each pixel PX may be formed as shown in FIG. 2. For example, the first electrodes 210 and the second electrodes 220 of the pixels PX may be formed from the alignment lines divided by the separation portion ROP in the alignment lines.

The first electrode 210 may be electrically connected to a circuit element layer CCL (refer to FIG. 3) through a first electrode contact hole CTD. Descriptions of the circuit element layer CCL (refer to FIG. 3) are provided below with reference to FIG. 3. The second electrode 220 may be electrically connected to the circuit element layer CCL through a second electrode contact hole CTS. Since the first electrode 210 is electrically connected to the circuit element layer CCL through the first electrode contact hole CTD and the second electrode 220 is electrically connected to the circuit element layer CCL through the second electrode contact hole CTS, an electrical signal applied to the circuit element layer CCL may be transmitted to ends (e.g., one end and another end) of the light emitting element ED through the first electrode 210 and the second electrode 220. Although the first and second electrode contact holes CTD and CTS overlap the second bank 600 in the Z-axis direction Z in a plan view, the positions of the first and second electrode contact holes CTD and CTS are not limited thereto.

The first bank 400 may be disposed in the emission area EMA. The first bank 400 may include sub-banks extending in the Y-axis direction Y and spaced apart from each other in the X-axis direction X. For example, the first bank 400 may include a first sub-bank 410 and a second sub-bank 420.

The first sub-bank 410 may overlap the first electrode 210 in the Z-axis direction Z in the emission area EMA of each pixel PX. The second sub-bank 420 may overlap the second electrode 220 in the Z-axis direction Z in the emission area EMA of each pixel PX.

The second bank 600 may be disposed across the boundary of adjacent pixels PX to divide the pixels PX and may divide the emission area EMA and the sub-region SA. For example, the second bank 600 may include openings respectively overlapping the emission area EMA and the sub-region SA in the Z-axis direction Z to define the emission area EMA and the sub-region SA.

The second bank 600 may be disposed across the boundary of the pixels PX, so that ink in which the light emitting elements ED are dispersed (or distributed) may be sprayed into the emission area EMA of each pixel PX without being mixed with ink of an adjacent pixel PX in an inkjet printing process for aligning the light emitting elements ED during the manufacturing process of the display device 10. For example, the second bank 600 may separate ink of adjacent pixels PX during the inkjet printing process for aligning the light emitting elements ED dispersed (or distributed) in ink. The second bank 600 may surround the emission area EMA and the sub-region SA, and may serve or function as a partition wall or bank for guiding the ink in which the light emitting elements ED are dispersed (or distributed). Thus, ink may be stably sprayed to the emission area EMA without being sprayed to the sub-region SA in the inkjet process for aligning the light emitting elements ED during the manufacturing process of the display device 10.

The light emitting elements ED may be arranged in the emission area EMA. The light emitting elements ED may not be disposed in the sub-region SA.

The light emitting elements ED may be disposed between the first sub-bank 410 and the second sub-bank 420 in the emission area EMA. The light emitting element ED may have a shape extending in a direction, and the extension direction of the light emitting element ED may be substantially perpendicular to the extension direction of the first electrode 210 and the second electrode 220. However, the disclosure is not limited thereto, and the light emitting elements ED may be arranged to extend in a direction oblique to the extension direction of the first electrode 210 and the second electrode 220. For example, the extension direction of the light emitting element ED may intersect the extension direction of the first electrode 210 and the second electrode 220. The light emitting elements ED may be arranged in the area where the first sub-bank 410 and the second sub-bank 420 face each other while being spaced apart from each other such that at least one of ends of the light emitting elements ED is disposed on the first electrode 210 or the second electrode 220.

The light emitting elements ED may be spaced apart from each other. The light emitting elements ED may be spaced apart from each other in the Y-axis direction Y between the first sub-bank 410 and the second sub-bank 420.

The contact electrode 700 may be disposed across the emission area EMA and the sub-region SA. A portion of the contact electrode 700 may be disposed in the emission area EMA, and another portion of the contact electrode 700 may be disposed in the sub-region SA. The contact electrode 700 may include contact electrodes extending in the Y-axis direction Y and spaced apart from each other in the X-axis direction X. For example, the contact electrode 700 may include a first contact electrode 710 and a second contact electrode 720.

The first contact electrode 710 may overlap the first electrode 210 in the Z-axis direction Z in the emission area EMA and the sub-region SA of each pixel PX. The first contact electrode 710 may overlap one ends (or first ends) of the light emitting elements ED in the emission area EMA of each pixel PX. For example, the first contact electrode 710 may overlap an end (or one end) of each light emitting element ED in the emission area EMA of each pixel PX in a plan view.

The first contact electrode 710 may be in contact with (or may contact) the first electrode 210 through a first contact portion CT1 in the sub-region SA of each pixel PX, and may be in contact with one ends of the light emitting elements ED in the emission area EMA of each pixel PX. Since the first contact electrode 710 is in contact with one end of the light emitting element ED and the first electrode 210, the first contact electrode 710 may electrically connect one end of the light emitting element ED to the first electrode 210. On the other hand, although it is illustrated in the drawing that the first contact electrode 710 is in contact with the first electrode 210 in the sub-region SA of each pixel PX, the disclosure is not limited thereto. For example, the first contact electrode 710 may be in contact with (or may contact) the first electrode 210 in the emission area EMA of each pixel PX.

The second contact electrode 720 may overlap the second electrode 220 in the Z-axis direction Z in the emission area EMA and the sub-region SA of each pixel PX. The second contact electrode 720 may overlap the other ends (or second ends) of the light emitting elements ED in the emission area EMA of each pixel PX in a plan view.

The second contact electrode 720 may be in contact with the second electrode 220 through a second contact portion CT2 in the sub-region SA of each pixel PX, and may be in contact with the other ends of the plurality of light emitting elements ED in the emission area EMA of each pixel PX. Since the second contact electrode 720 is in contact with the other end of the light emitting element ED and the second electrode 220, the second contact electrode 720 may serve to electrically connect the other end of the light emitting element ED to the second electrode 220. On the other hand, although it is illustrated in the drawing that the second contact electrode 720 is in contact with the second electrode 220 in the sub-region SA of each pixel PX, the disclosure is not limited thereto. For example, the second contact electrode 720 may be in contact with the second electrode 220 in the emission area EMA of each pixel PX.

As described above, the first contact electrode 710 and the second contact electrode 720 may be spaced apart from each other in the X-axis direction X. A gap between the first contact electrode 710 and the second contact electrode 720 may be smaller than a length in the extension direction of the light emitting element ED. Therefore, the first contact electrode 710 and the second contact electrode 720 may be spaced apart from each other in the X-axis direction X, and may be in contact with ends (e.g., one end and another end) of the light emitting element ED.

Figure 3:
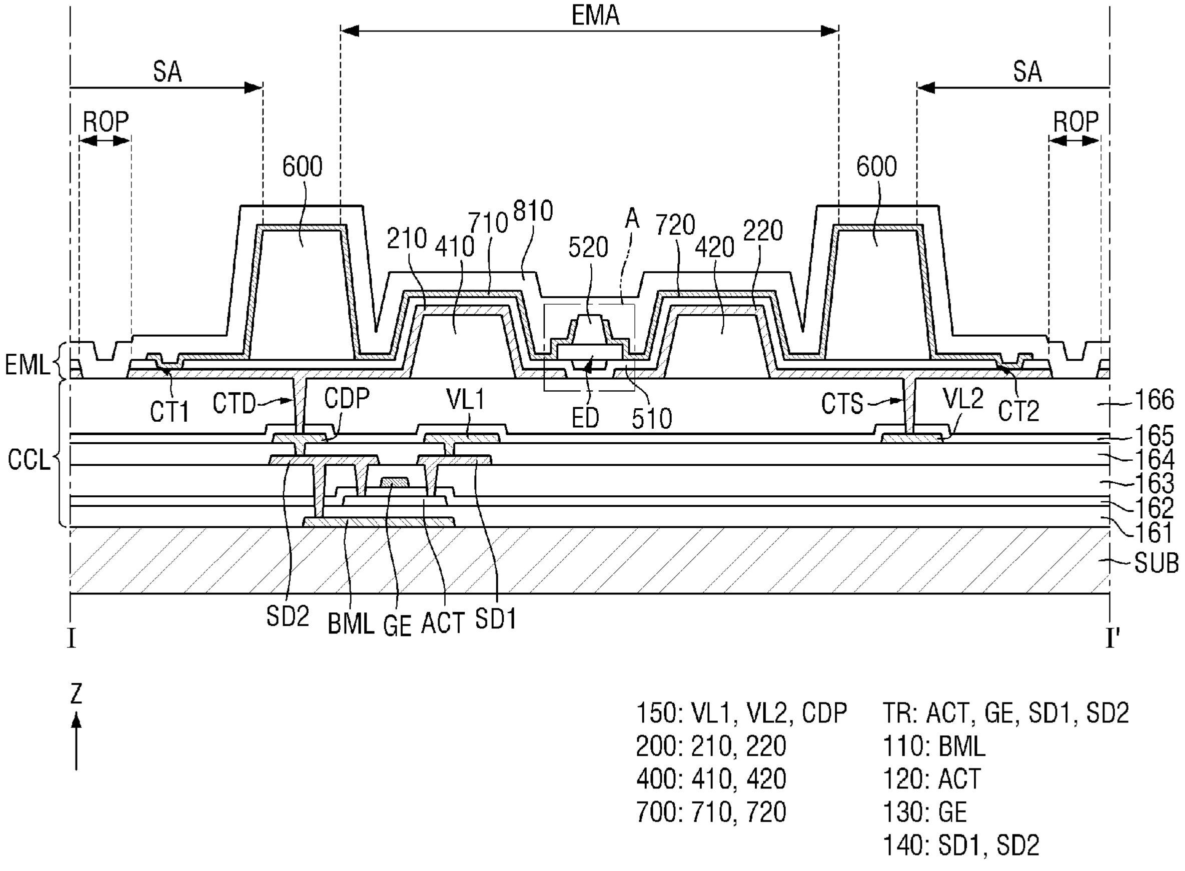
FIG. 3 is a schematic cross-sectional view illustrating an example taken along line I-I' of FIG. 2.

FIG. 3 is a schematic cross-sectional view illustrating an example taken along line I-I' of FIG. 2.

Referring to FIG. 3, the display device 10 may include a substrate SUB, the circuit element layer CCL, and a light emitting element layer EML.

The substrate SUB may be a base substrate or a base member. The substrate SUB may be made of (or include) an insulating material such as glass, quartz, polymer resin, or the like. The substrate SUB may be (or include) a rigid substrate, but may also be a flexible substrate which may be bent, folded or rolled.

The circuit element layer CCL may be disposed on the substrate SUB. The circuit element layer CCL may include at least one transistor and the like to drive the light emitting element layer EML of each pixel PX.

The circuit element layer CCL may include a lower metal layer 110, a semiconductor layer 120, a first conductive layer 130, a second conductive layer 140, a third conductive layer 150, and insulating layers.

The lower metal layer 110 may be disposed on the substrate SUB. The lower metal layer 110 may include a light blocking pattern BML. The light blocking pattern BML, may cover (or overlap) at least a channel region of an active layer ACT of the transistor TR from the bottom. For example, the light blocking pattern BML may be disposed under the channel region of the active layer ACT of the transistor TR. However, the disclosure is not limited thereto, and the light blocking pattern BML may be omitted.

The lower metal layer 110 may contain (or include) a material that blocks light. For example, the lower metal layer 110 may be made of an opaque metal material that blocks transmission of light.

A buffer layer 161 may be disposed on the lower metal layer 110. The buffer layer 161 may cover the entire surface of the substrate SUB where the lower metal layer 110 is disposed. The buffer layer 161 may protect transistors from moisture permeating through the substrate SUB that is susceptible (or vulnerable) to the moisture permeation.

The semiconductor layer 120 may be disposed on the buffer layer 161. The semiconductor layer 120 may include the active layer ACT of the transistor TR. The active layer ACT of the transistor TR may overlap the light blocking pattern BML of the lower metal layer 110 as described above.

The semiconductor layer 120 may include polycrystalline silicon, monocrystalline silicon, an oxide semiconductor, or the like. In an embodiment, in case that the semiconductor layer 120 contains (or includes) polycrystalline silicon, the polycrystalline silicon may be formed by crystallizing amorphous silicon. In case that the semiconductor layer 120 contains polycrystalline silicon, the active layer ACT of the transistor TR may include doping regions doped with impurities and channel regions disposed therebetween. In another embodiment, the semiconductor layer 120 may contain an oxide semiconductor. The oxide semiconductor may be, for example, indium tin oxide (ITO), indium zinc oxide (IZO), indium gallium oxide (IGO), indium zinc tin oxide (IZTO), indium gallium zinc oxide (IGZO), indium gallium tin oxide (IGTO), indium gallium zinc tin oxide (IGZTO), or the like.

A gate insulating layer 162 may be disposed on the semiconductor layer 120. The gate insulating layer 162 may be formed as a multilayer in which inorganic layers including an inorganic material, for example, at least one of silicon oxide ($SiO_x$), silicon nitride ($SiN_x$) and silicon oxynitride ($SiO_xN_y$) are alternately stacked.

The first conductive layer 130 may be disposed on the gate insulating layer 162. The first conductive layer 130 may include a gate electrode GE of the transistor TR. The gate electrode GE may overlap the channel region of the active layer ACT in the Z-axis direction Z which is the thickness direction of the substrate SUB (or display device 10).

A first interlayer insulating layer 163 may be disposed on the first conductive layer 130. The first interlayer insulating layer 163 may cover (or overlap) the gate electrode GE. The first interlayer insulating layer 163 may function as an insulating layer between the first conductive layer 130 and other layers disposed thereon to protect the first conductive layer 130.

A second conductive layer 140 may be disposed on the first interlayer insulating layer 163. The second conductive layer 140 may include a drain electrode SD1 of the transistor TR and a source electrode SD2 of the transistor TR.

The drain electrode SD1 and the source electrode SD2 of the transistor TR may be electrically connected to ends (e.g., one end and another end) of the active layer ACT of the transistor TR, respectively, through contact holes penetrating the first interlayer insulating layer 163 and the gate insulating layer 162. The source electrode SD2 of the transistor TR may be electrically connected to the light blocking pattern BML, of the lower metal layer 110 through another contact hole penetrating the first interlayer insulating layer 163, the gate insulating layer 162, and the buffer layer 161.

The second interlayer insulating layer 164 may be disposed on the second conductive layer 140. The second interlayer insulating layer 164 may cover the drain electrode SD1 of the transistor TR and the source electrode SD2 of the transistor TR. The second interlayer insulating layer 164 may function as an insulating layer between the second conductive layer 140 and other layers disposed thereon, and may protect the second conductive layer 140.

A third conductive layer 150 may be disposed on the second interlayer insulating layer 164. The third conductive layer 150 may include a first voltage line VL1, a second voltage line VL2, and a conductive pattern CDP.

The first voltage line VL1 may overlap at least part of the drain electrode SD1 of the transistor TR in the thickness direction of the substrate SUB (or display device 10). A high potential voltage (or first source voltage) supplied to the transistor TR may be applied to the first voltage line VL1. For example, the high potential voltage (or first source voltage) may be applied to the transistor TR through the first voltage line VL.

The second voltage line VL2 may be electrically connected to the second electrode 220 through the second electrode contact hole CTS penetrating a via layer 166 and a passivation layer 165. Descriptions of the via layer 166 and the passivation layer 165 are provided below with reference to the drawings. A low potential voltage (or second source voltage) lower than the high potential voltage supplied to the first voltage line VL1 may be applied to the second voltage line VL2.

For example, the high potential voltage (or first power voltage) supplied to the transistor TR may be applied to the first voltage line VL1, and the low potential voltage (or second power voltage) lower than the high potential voltage supplied to the first voltage line VL1 may be applied to the second voltage line VL2.

The conductive pattern CDP may be electrically connected to the source electrode SD2 of the transistor TR. The conductive pattern CDP may be electrically connected to the source electrode SD2 of the transistor TR through the contact hole penetrating the second interlayer insulating layer 164. The conductive pattern CDP may be electrically connected to the first electrode 210 through the first electrode contact hole CTD penetrating the via layer 166 and the passivation layer 165. Descriptions of the via layer 166 and the passivation layer 165 are provided below with reference to the drawings.

The passivation layer 165 may be disposed on the third conductive layer 150 including the first voltage line VL1, the second voltage line VL2, and the conductive pattern CDP. The passivation layer 165 may cover (or overlap) the third conductive layer 150. The passivation layer 165 may protect the third conductive layer 150.

Each of the buffer layer 161, the first gate insulating layer 162, the first interlayer insulating layer 163, the second interlayer insulating layer 164, and the passivation layer 165 described above may be formed of (or include) inorganic layers stacked in an alternating manner. For example, each of the buffer layer 161, the gate insulating layer 162, the first interlayer insulating layer 163, the second interlayer insulating layer 164, and the passivation layer 165 described above may be formed as a double layer formed by stacking, or multiple layers formed by alternately stacking inorganic layers. The inorganic layers of each of the buffer layer 161, the gate insulating layer 162, the first interlayer insulating layer 163, the second interlayer insulating layer 164, and the passivation layer 165 may include at least one of silicon oxide ($SiO_x$), silicon nitride ($SiN_x$), and silicon oxynitride ($SiO_xN_y$). However, the disclosure is not limited thereto, and each of the buffer layer 161, the gate insulating layer 162, the first interlayer insulating layer 163, the second interlayer insulating layer 164, and the passivation layer 165 described above may be formed as a single inorganic layer containing the above-described insulating material.

The via layer 166 may be disposed on the passivation layer 165. The via layer 166 may substantially have a flat surface regardless of the shape or existence of pattern disposed thereunder. For example, the via layer 166 may flatten (or planarize) the upper portion of the passivation layer 165. The via layer 166 may include an organic insulating material, for example, an organic material such as polyimide (PI).

Referring to FIGS. 2 and 3, the light emitting element layer EML may be disposed on the circuit element layer CCL. The light emitting element layer EML may include the first bank 400, the electrode layer 200, a first insulating layer 510, the second bank 600, the light emitting element ED, and a second insulating layer 520, and the contact electrode 700. The light emitting element layer EML may further include a protective layer 810.

The first bank 400 may be disposed on the via layer 166. The first bank 400 may be disposed directly on the top surface of the via layer 166. Each of the first sub-bank 410 and the second sub-bank 420 included in the first bank 400 may have a structure in which at least part thereof protrudes with respect to the top surface of the via layer 166 in a cross-sectional view. For example, a portion of each of the first sub-bank 410 and the second sub-bank 420 may protrude from the top surface of the via layer 166 in the cross-sectional view.

The first sub-bank 410 and the second sub-bank 420 may guide the light emitting elements ED to be arranged between the first electrode 210 and the second electrode 220 in the process of aligning the light emitting elements ED during the manufacturing process of the display device 10. The light emitting elements ED may be disposed in a separation space between the first sub-bank 410 and the second sub-bank 420.

The first sub-bank 410 and the second sub-bank 420 may include inclined side surfaces, and change (or guide) the traveling direction of the light emitted from the light emitting element ED toward the inclined side surfaces of the first sub-bank 410 and the second sub-bank 420 in an upward direction. For example, the first bank 400 may serve as a reflective partition wall or bank that provides a space where the light emitting element ED is disposed and changes the traveling direction of the light emitted from the light emitting element ED in the upward direction. For example, the light emitted from the light emitting element ED in a direction different from the upward direction may be reflected from the side surfaces (or inclined side surfaces) of the first sub-bank 410 and the second sub-bank 420, and the reflected light may be guided in the upward direction.

The side surfaces of the sub-banks 410 and 420 included in the first bank 400 may be inclined in a linear shape. However, the disclosure is not limited thereto. For example, the side surfaces (or outer surfaces) of the sub-banks 410 and 420 included in the first bank 400 may have a curved semicircular or semi-elliptical shape. In an embodiment, the first bank 400 may include an organic insulating material such as polyimide (PI), but is not limited thereto.

The electrode layer 200 may be disposed on the first bank 400 and the via layer 166 exposed by the first bank 400. The electrode layer 200 may be disposed across the emission area EMA and the sub-region SA. For example, a portion of the electrode layer 200 may be disposed in the emission area EMA, and another portion of the electrode layer 200 may be disposed in the sub-region SA.

The first electrode 210 and the second electrode 220 may be disposed on the first bank 400 and the via layer 166 exposed by the first bank 400 in the emission area EMA, and may be disposed on the via layer 166 in the non-emission area. For example, the first bank 400 may only be disposed in the emission area EMA, and the first electrode 210 and the second electrode 220 may be disposed on the first bank 400 and the via layer 166 exposed by the first bank 400 in the emission area EMA. However, the first bank 400 may not be disposed in the non-emission area, and the first electrode 210 and the second electrode 220 may only be disposed on the via layer 166 in the non-emission area.

The first electrode 210 may be disposed on the first sub-bank 410, and the second electrode 220 may be disposed on the second sub-bank 420 in the emission area EMA. The first electrode 210 may be disposed on at least one side surface of the first sub-bank 410 facing the second sub-bank 420 in the emission area EMA, and the second electrode 220 may be disposed on at least one side surface of the second sub-bank 420 facing the first sub-bank 410 in the emission area EMA. The first electrode 210 and the second electrode 220 may cover (or overlap) the side surfaces of the first sub-bank 410 and the second sub-bank 420 facing each other, and reflect the light emitted from the light emitting element ED. For example, the light emitted from the light emitting element ED may be reflected from the first electrode 210 and the second electrode 220, which are disposed on the side surfaces of the first sub-bank 410 and the second sub-bank 420.

The first electrode 210 may be electrically connected to the circuit element layer CCL through the first electrode contact hole CTD penetrating the via layer 166 and the passivation layer 165, and the second electrode 220 may be electrically connected to the circuit element layer CCL through the second electrode contact hole CTS penetrating the via layer 166 and the passivation layer 165. For example, the first electrode 210 may be electrically connected to the conductive pattern CDP through the first electrode contact hole CTD, and the second electrode 220 may be electrically connected to the second voltage line VL2 through the second electrode contact hole CTS. The first electrode 210 may be in contact with a top surface of the conductive pattern CDP exposed by the first electrode contact hole CTD, and the second electrode 220 may be in contact with a top surface of the second voltage line VL2 exposed by the second electrode contact hole CTS. The first electrode 210 may be electrically connected to the transistor TR through the conductive pattern CDP. A second power voltage may be applied to the second electrode 220 through the second voltage line VL2. On the other hand, although it is illustrated in the drawing that the first and second electrode contact holes CTD and CTS overlap the second bank 600 in the Z-axis direction Z in a plan view, the positions of the first and second electrode contact holes CTD and CTS are not limited thereto.

As described above, the first electrode 210 and the second electrode 220 of the pixel PX may be spaced apart from another first electrode 210 and another second electrode 220 included in a pixel PX adjacent in the Y-axis direction Y by the separation portion ROP located in the sub-region SA. For example, the separation portion ROP may be disposed between the first electrodes 210 (or second electrodes 220) of adjacent ones of the pixels PX in the Y-axis direction. Therefore, the via layer 166 may be exposed between the first electrode 210 and the second electrode 220 in an area overlapping the separation portion ROP.

The first electrode 210 and the second electrode 220 may be electrically connected to the light emitting element ED. The first electrode 210 and the second electrode 220 may be respectively connected to ends (e.g., one end and another end) of the light emitting element ED through the first contact electrode 710 and the second contact electrode 720, and may transmit the electrical signal applied from the circuit element layer CCL to the light emitting element ED.

The electrode layer 200 may include a conductive material having high reflectivity. For example, the electrode layer 200 may contain (or include) a material having high reflectivity. The material having high reflectivity of the electrode layer 200 may include a metal such as silver (Ag), copper (Cu), aluminum (Al), molybdenum (Mo), titanium (Ti), or the like, or an alloy containing (or including) aluminum (Al), nickel (Ni), lanthanum (La), or the like. The electrode layer 200 may reflect the light emitted from the light emitting element ED and traveling toward the side surface of the first bank 400 in the upward direction. For example, the light emitted from the light emitting element ED toward the side surface of the first bank 400 may be reflected from the electrode layer 200 and guided in the upward direction. However, the disclosure is not limited thereto, and the electrode layer 200 may further include a transparent conductive material. For example, the electrode layer 200 may include a material such as ITO, IZO, ITZO, or the like. In another embodiment, the electrode layer 200 may have a structure in which at least one transparent conductive material and at least one metal layer having high reflectivity are stacked, or may be formed as one layer including the above-described material. For example, the electrode layer 200 may have a stacked structure of ITO/Ag/ITO, ITO/Ag/IZO, ITO/Ag/ITZO/IZO, or the like.

The first insulating layer 510 may be disposed on the electrode layer 200. The first insulating layer 510 may cover (or overlap) the electrode layer 200 and the via layer 166 exposed by the electrode layer 200. The first insulating layer 510 may protect the electrode layer 200 and insulate (or electrically insulate) the first electrode 210 and the second electrode 220 from each other.

The first insulating layer 510 may include the first and second contact portions CT1 and CT2 respectively exposing at least part of the first electrode 210 and at least part of the second electrode 220. The contact electrode 700 and the electrode layer 200 may be electrically connected through the first and second contact portions CT1 and CT2 penetrating the first insulating layer 510, respectively. Although the first and second contact portions CT1 and CT2 exposing a part of the electrode layer 200 are located in the sub-region SA in the drawings, the disclosure is not limited thereto. For example, the first and second contact portions CT1 and CT2 exposing a part of the electrode layer 200 may be located in the emission area EMA.

The second bank 600 may be disposed on the first insulating layer 510 and have a predetermined height. The height of the second bank 600 may be greater than the height of the first bank 400. Since the second bank 600 has a predetermined height and surrounds the sub-region SA, the ink in which the light emitting elements ED are dispersed may be sprayed into the emission area EMA without being sprayed to the sub-region SA in the inkjet printing process for aligning the light emitting elements ED during the manufacturing process of the display device 10. In an embodiment, the second bank 600 may include an organic insulating material such as polyimide (PI), but the disclosure is not limited thereto.

The light emitting elements ED may be disposed on the first insulating layer 510 in the emission area EMA. The light emitting elements ED may be arranged in the emission area EMA, and may not be arranged in the sub-region SA. The light emitting element ED may be disposed between the first sub-bank 410 and the second sub-bank 420 in the emission area EMA. The ends (e.g., one end and another end) of the light emitting element ED may be located on the first electrode 210 and the second electrode 220, respectively.

The light emitting elements ED may emit light of a specific wavelength band. For example, the light emitting element ED may emit third color light or blue light having a peak wavelength in the range of about 480 nm or less, or a peak wavelength in the range of about 445 nm to about 480 nm.

The second insulating layer 520 may be disposed on the light emitting element ED. The second insulating layer 520 may partially surround an outer surface of the light emitting element ED, and may not cover (or overlap) the ends (e.g., one end and another end) of the light emitting element ED. Therefore, a width of the second insulating layer 520 may be smaller than the length of the light emitting element ED. The second insulating layer 520 may protect the light emitting element ED and fix the light emitting element ED in the manufacturing process of the display device 10, but the disclosure is not limited thereto.

The contact electrode 700 may be disposed on the second insulating layer 520. The first contact electrode 710 and the second contact electrode 720 may be spaced apart from each other, and the second insulating layer 520 may be disposed or interposed therebetween. The first contact electrode 710 and the second contact electrode 720 may electrically connect the first and second electrodes 210 and 220 to the light emitting element ED. For example, the first and second contact electrodes 710 and 720 may electrically connect the first and second electrodes 210 and 220 to ends (e.g., one end and another end) of the light emitting element ED, respectively.

The first contact electrode 710 may be in contact with (or contact) the first electrode 210 and the end (or one end) of the light emitting element ED. For example, the first contact electrode 710 may be in contact with one end of the light emitting element ED exposed by the second insulating layer 520 in the emission area EMA, and may be in contact with the first electrode 210 exposed by the first contact portion CT1 penetrating the first insulating layer 510 in the sub-region SA. Since the first contact electrode 710 is in contact with each of the first electrode 210 and one end of the light emitting element ED, the first contact electrode 710 may electrically connect one end of the light emitting element ED to the first electrode 210.

The second contact electrode 720 may be in contact with the second electrode 220 and the other end of the light emitting element ED. Specifically, the second contact electrode 720 may be in contact with the other end of the light emitting element ED exposed by the second insulating layer 520 in the emission area EMA, and may be in contact with the second electrode 220 exposed by the second contact portion CT2 penetrating the first insulating layer 510 in the sub-region SA. Since the second contact electrode 720 is in contact with the other end of the light emitting element ED and the second electrode 220, the second contact electrode 720 may electrically connect the other end of the light emitting element ED to the second electrode 220.

The contact electrode 700 may include a conductive material. For example, the contact electrode 700 may include ITO, IZO, ITZO, aluminum (Al), or the like. For example, the contact electrode 700 may include a transparent conductive material, and light emitted from the light emitting element ED may pass through the contact electrode 700 to travel toward the first electrode 210 and the second electrode 220. The light traveling toward the first electrode 210 and the second electrode 210 may be reflected from outer surfaces of the first electrode 210 and the second electrode 220. For example, the reflected light may be guided in the thickness direction (e.g., the Z-axis direction).

The protective layer 810 may be disposed on the contact electrode 700. The protective layer 810 may cover (or overlap) the entire surface of the substrate SUB to protect the first bank 400, the electrode layer 200, the light emitting elements ED, the contact electrode 700, and the second bank 600 disposed thereunder.

Figure 4:
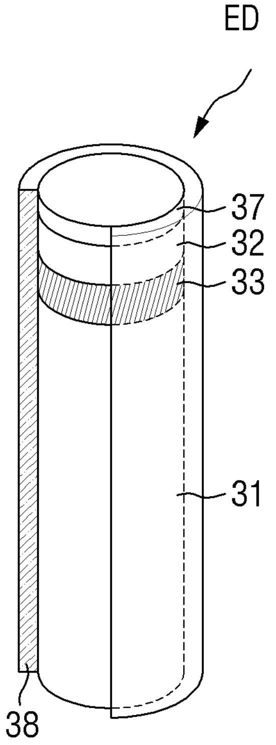
FIG. 4 is a schematic perspective view of a light emitting element according to an embodiment.

FIG. 4 is a schematic perspective view of a light emitting element according to an embodiment.

Referring to FIG. 4, the light emitting element ED may be a particulate element and may have a rod or cylindrical shape having a predetermined aspect ratio. The length of the light emitting element ED may be greater than a diameter of the light emitting element ED, and the aspect ratio may be about 6:5 to about 100:1, but the disclosure is not limited thereto.

The light emitting element ED may have a size of a nanometer scale (equal to or greater than 1 nm and less than 1 μm) to a micrometer scale (equal to or greater than 1 μm and less than 1 mm). In an embodiment, the diameter and the length of the light emitting element ED may be on a nanometer scale, or on a micrometer scale. In another embodiment, the diameter of the light emitting element ED may be on a nanometer scale, while the length of the light emitting element ED may be on a micrometer scale. In another embodiment, some of the light emitting elements ED may have a diameter and/or length on a nanometer scale, while some others of the light emitting elements ED may have a diameter and/or length on a micrometer scale.

In an embodiment, the light emitting element ED may be (or include) an inorganic light emitting diode. The inorganic light emitting diode may include semiconductor layers. For example, the inorganic light emitting diode may include a first conductive (e.g., n-type) semiconductor layer, a second conductive (e.g., p-type) semiconductor layer, and an active semiconductor layer interposed therebetween. The active semiconductor layer may receive holes and electrons from the first conductive semiconductor layer and the second conductive semiconductor layer, respectively, and the holes and electrons that have reached the active semiconductor layer may be coupled (or combined) to emit light.

In an embodiment, the above-described semiconductor layers may be sequentially stacked in a direction, which is a length direction of the light emitting element ED. The light emitting element ED may include a first semiconductor layer 31, an element active layer 33, and a second semiconductor layer 32 that are sequentially stacked in the direction. The first semiconductor layer 31, the element active layer 33, and the second semiconductor layer 32 may be the first conductive semiconductor layer, the active semiconductor layer, and the second conductive semiconductor layer described above, respectively.

The first semiconductor layer 31 may be doped with a first conductive dopant. The first conductive dopant may be (or include) Si, Ge, Sn, or the like. In an embodiment, the first semiconductor layer 31 may be n-GaN doped with n-type Si.

The second semiconductor layer 32 may be spaced apart from the first semiconductor layer 31, and the element active layer 33 may be interposed therebetween. The second semiconductor layer 32 may be doped with a second conductive dopant such as Mg, Zn, Ca, Se, Ba, or the like. In an embodiment, the second semiconductor layer 32 may be p-GaN doped with p-type Mg.

The element active layer 33 may include a material having a single or multiple quantum well structures. As described above, the element active layer 33 may emit light by coupling of electron-hole pairs according to an electrical signal applied thereto through the first semiconductor layer 31 and the second semiconductor layer 32.

In another embodiment, the element active layer 33 may have a structure in which semiconductor materials having large band gap energy and semiconductor materials having small band gap energy are alternately stacked, and may include group III to V semiconductor materials according to the wavelength band of the emitted light.

Light emitted from the element active layer 33 may be emitted to the end surfaces (e.g., one end surface and another end surface) of the light emitting element ED in the length direction and to an outer peripheral surface (or outer surface or side surface) of the light emitting element ED in various directions (e.g., radial direction, diagonal direction, or the like). For example, the directionality of the light emitted from the element active layer 33 is not limited to the above-described directions.

The light emitting element ED may further include an element electrode layer 37 disposed on the second semiconductor layer 32. The element electrode layer 37 may be in contact with the second semiconductor layer 32. The element electrode layer 37 may be an Ohmic contact electrode. However, the element electrode layer 37 is not limited thereto, and may be a Schottky contact electrode.

In case that the ends (e.g., one end and another end) of the light emitting element ED are electrically connected to the contact electrodes 700 to apply an electrical signal to the first and second semiconductor layers 31 and 32, the element electrode layer 37 may be disposed between the second semiconductor layer 32 and the electrode to reduce resistance. The element electrode layer 37 may include at least one of aluminum (Al), titanium (Ti), indium (In), gold (Au), silver (Ag), indium tin oxide (ITO), indium zinc oxide (IZO), and indium tin zinc oxide (ITZO). The element electrode layer 37 may include an n-type or p-type doped semiconductor material.

The light emitting element ED may further include an element insulating layer 38 surrounding outer peripheral surfaces of the first semiconductor layer 31, the second semiconductor layer 32, and the element active layer 33 and/or the element electrode layer 37. The element insulating layer 38 may surround at least part of outer surface of the element active layer 33 and may extend in a direction (or length direction) in which the light emitting element ED extends. The element insulating layer 38 may protect the members such as the element active layer 33 or the like. Since the element insulating layer 38 is made of an insulating material, the element insulating layer 38 may prevent an electrical short circuit that may occur in case that the element active layer 33 contacts (e.g., directly contacts) an electrode (e.g., contact electrode 700 of FIG. 5) through which an electrical signal is transmitted to the light emitting element ED. For example, the element insulating layer 38 may electrically insulate the element active layer 33 from the electrode (e.g., contact electrode 700 of FIG. 5). Since the element insulating layer 38 includes the element active layer 33 to protect the outer peripheral surfaces of the first and second semiconductor layers 31 and 32, the element insulating layer 38 may prevent degradation in light emission efficiency.

Figure 5:
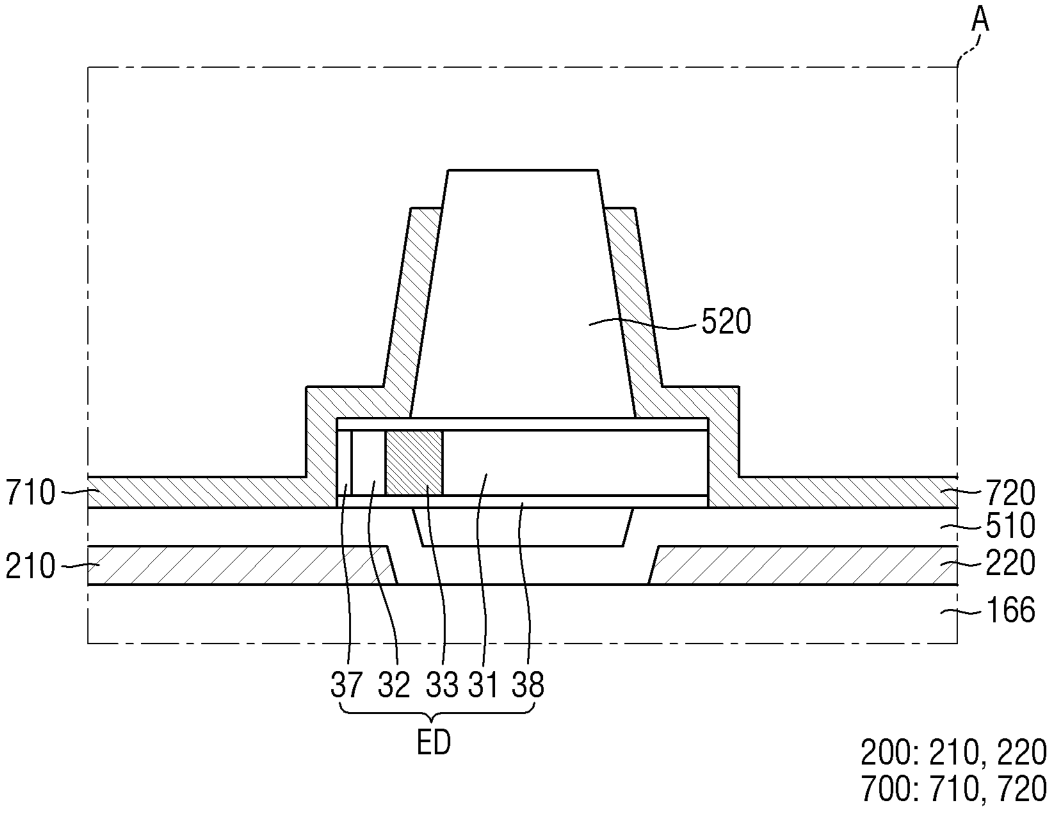
FIG. 5 is an enlarged cross-sectional view schematically illustrating an example of area A of FIG. 3.

FIG. 5 is an enlarged cross-sectional view schematically illustrating an example of area A of FIG. 3.

Referring to FIGS. 4 and 5, the light emitting element ED may extend in a direction parallel to a surface (e.g., top surface) of the substrate SUB. The semiconductor layers (e.g., first semiconductor layer 31, element active layer 33, second semiconductor layer 32, or the like) included in the light emitting element ED may be sequentially arranged in the direction parallel to the top surface of the substrate SUB. For example, the first semiconductor layer 31, the element active layer 33, and the second semiconductor layer 32 of the light emitting element ED may be sequentially arranged in the direction parallel to the top surface of the substrate SUB.

For example, in the light emitting element ED, the first semiconductor layer 31, the element active layer 33, the second semiconductor layer 32, and the element electrode layer 37 may be sequentially formed in the direction parallel to the top surface of the substrate SUB in a cross-sectional view across ends (e.g., one end and another end) of the light emitting element ED.

The light emitting element ED may be disposed such that one end thereof is located on the first electrode 210 and another end thereof is located on the second electrode 220. However, the disclosure is not limited thereto, and the light emitting element ED may be disposed such that one end thereof is located on the second electrode 220 and another end thereof is located on the first electrode 210.

The second insulating layer 520 may be disposed on the light emitting element ED. The second insulating layer 520 may surround the outer surface of the light emitting element ED. For example, the second insulating layer 520 may surround the outer surface of the light emitting element ED in an area in which the light emitting element ED is arranged, and may be disposed on the first insulating layer 510 exposed by the light emitting element ED in another area in which the light emitting element ED is not disposed. For example, the second insulating layer 520 may be disposed on the first insulating layer 510 and the light emitting element ED, and surround the light emitting element ED on the first insulating layer 510.

The first contact electrode 710 may be in contact with one end of the light emitting element ED exposed by the second insulating layer 520. For example, the first contact electrode 710 may surround one end surface of the light emitting element ED exposed by the second insulating layer 520. The first contact electrode 710 may be in contact with the element insulating layer 38 and the element electrode layer 37 of the light emitting element ED. For example, the first contact electrode 710 may be in contact with a portion of the outer surface of the element insulating layer 38 and an outer surface of the element electrode layer 37 of the light emitting element ED.

The second contact electrode 720 may be in contact with the end (or another end) of the light emitting element ED exposed by the second insulating layer 520. For example, the second contact electrode 720 may surround another end surface of the light emitting element ED exposed by the second insulating layer 520. The second contact electrode 720 may be in contact with (or electrically connected to) the element insulating layer 38 and the first semiconductor layer 31 of the light emitting element ED. For example, the second contact electrode 720 may be in contact with another portion of the element insulating layer 38 and an outer surface of the first semiconductor layer 31 of the light emitting element ED.

The first contact electrode 710 and the second contact electrode 720 may be spaced apart from each other, and the second insulating layer 520 may be interposed therebetween. The first contact electrode 710 and the second contact electrode 720 may expose at least part of the top surface of the second insulating layer 520. For example, the tope surface and a portion of side surfaces of the second insulating layer 520 may be exposed between the first contact electrode 710 and the second contact electrode 720.

The first contact electrode 710 and the second contact electrode 720 may be formed on a same layer and may contain (or include) a same material. For example, the first contact electrode 710 and the second contact electrode 720 may be formed simultaneously by one mask process. Therefore, no additional mask process for forming the first contact electrode 710 and the second contact electrode 720 may be required, and the efficiency of the manufacturing process of the display device 10 may be improved.

Figure 6:
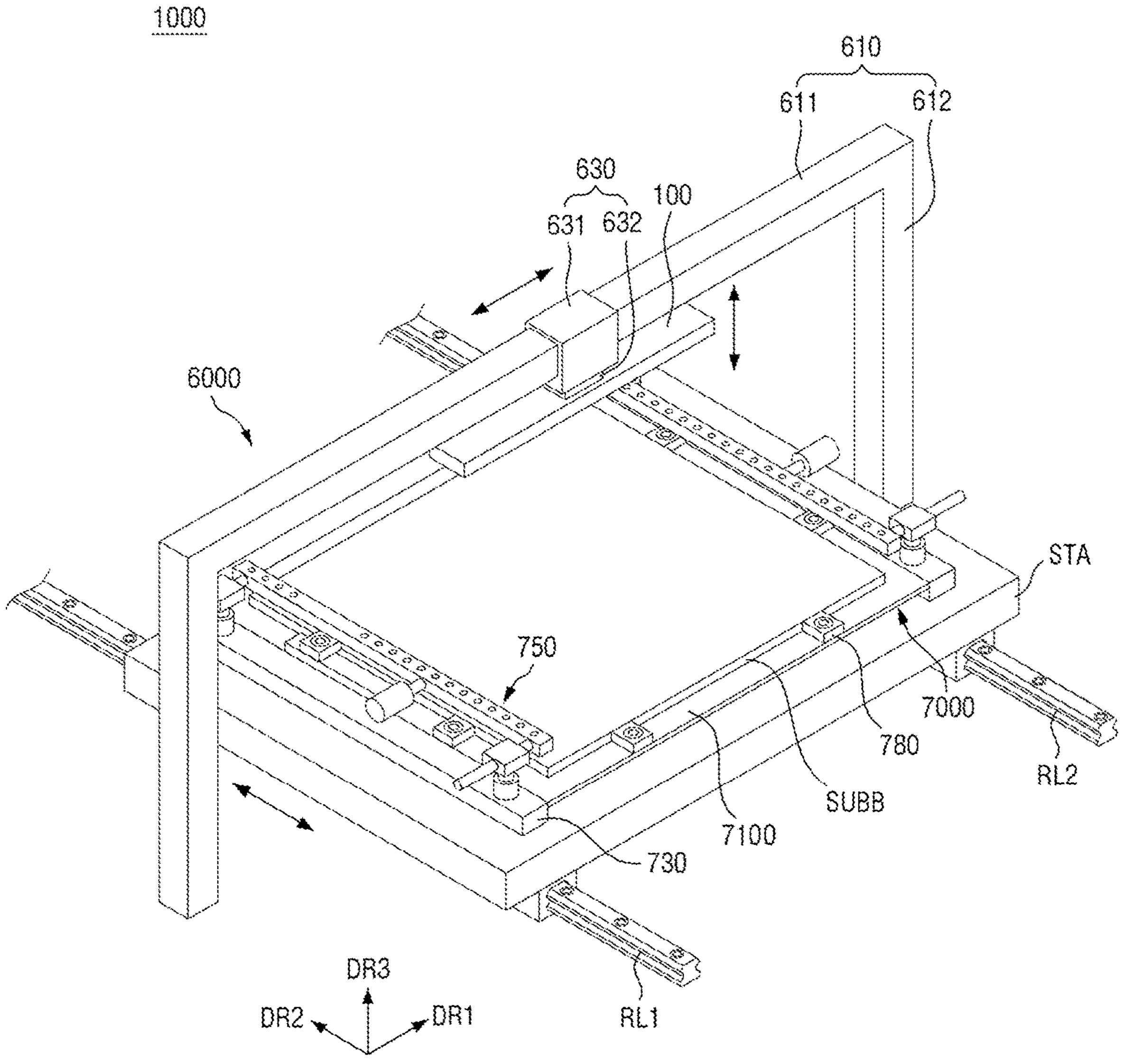
FIG. 6 is a schematic perspective view of an inkjet printing apparatus according to an embodiment.
Figure 7:
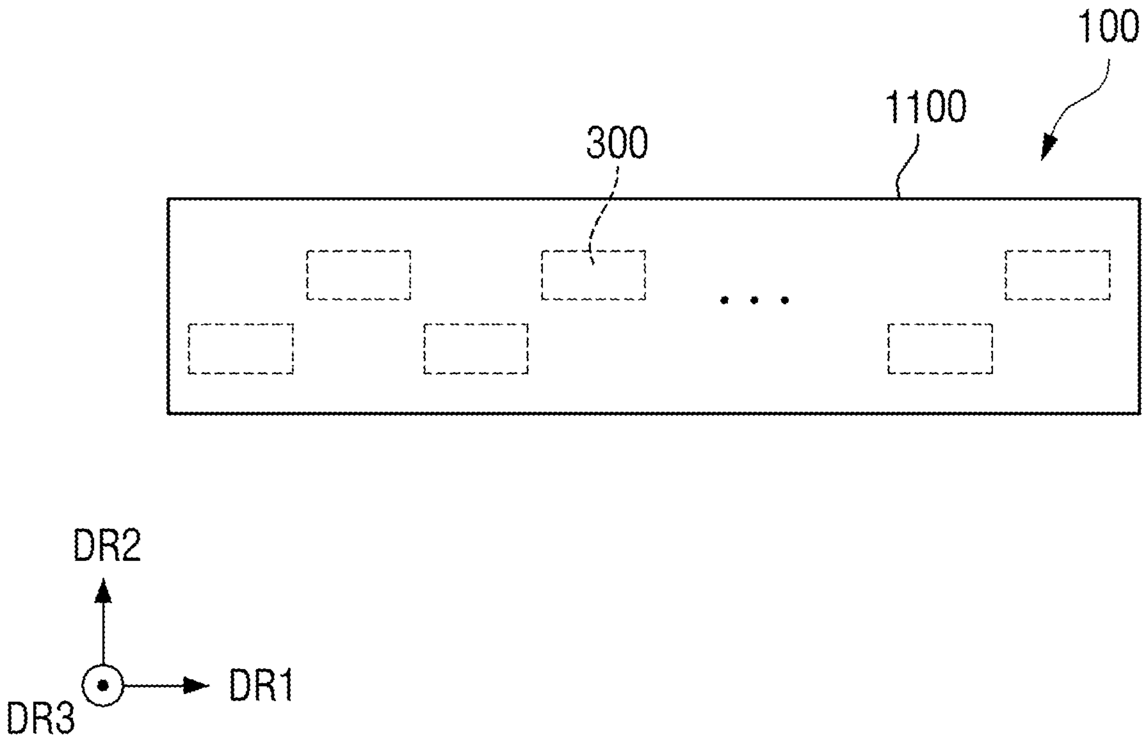
FIG. 7 is a schematic plan view of a print head part according to an embodiment.
Figure 8:
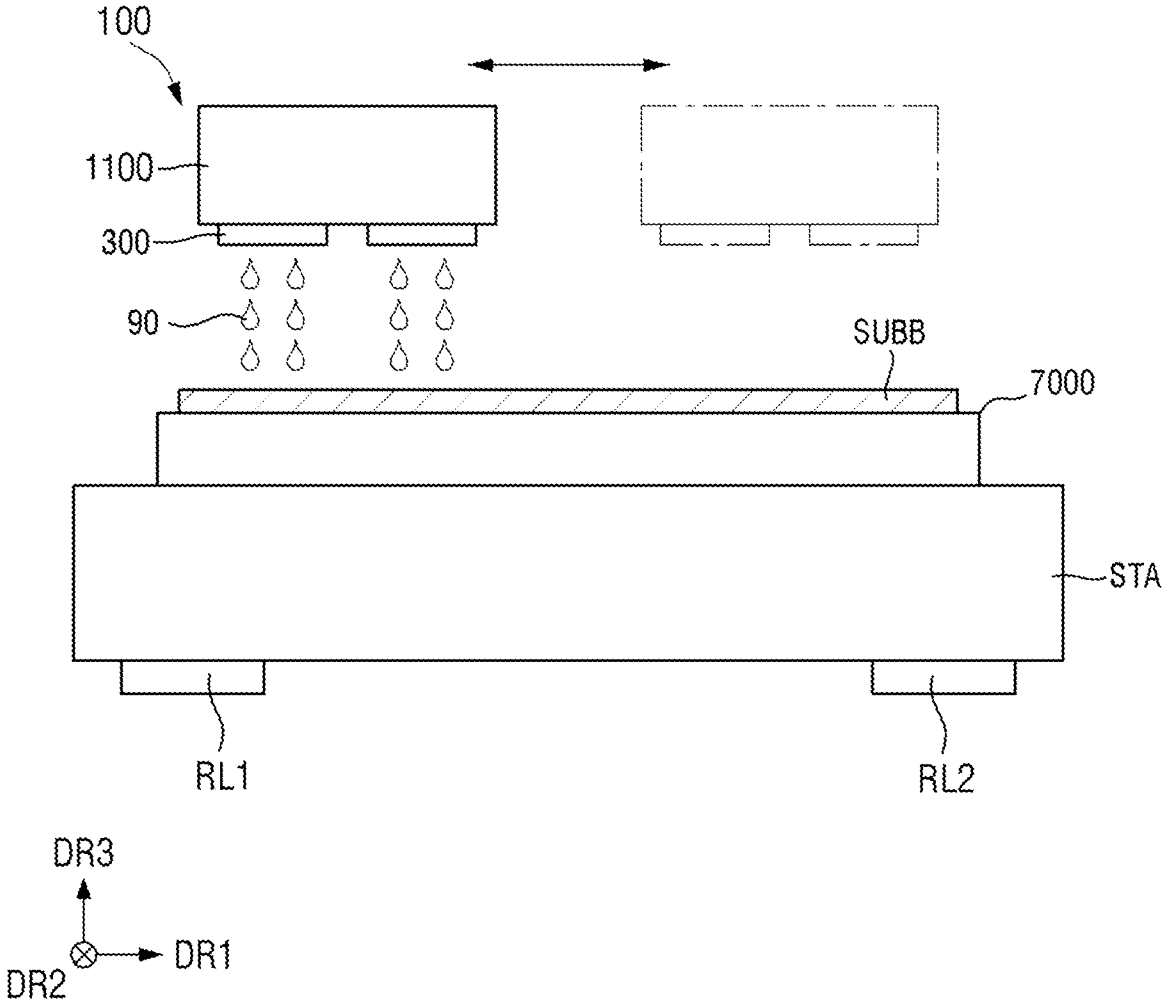
FIG. 8 is a schematic view showing the operation of a print head part according to an embodiment.

FIG. 6 is a schematic perspective view of an inkjet printing apparatus according to an embodiment. FIG. 7 is a schematic plan view of a print head part according to an embodiment. FIG. 8 is a schematic view showing the operation of a print head part according to an embodiment. FIG. 8 shows the shape of a print head part 100 according to an embodiment and a probe device 7000 disposed on a stage STA viewed from the front.

Referring to FIGS. 6 to 8, the inkjet printing apparatus 1000 according to an embodiment includes the print head part 100 and the probe device 7000. The print head part 100 may include inkjet heads 300. The inkjet printing apparatus 1000 may further include a first moving part including first and second rails RL1 and RL2 for moving the stage STA, a base frame 6000, and the stage STA.

An ink 90 may be supplied to each of the inkjet heads 300 of the inkjet printing apparatus 1000 according to an embodiment. The inkjet printing apparatus 1000 (e.g., inkjet head 300) may spray ink 90 (e.g., a portion of ink 90) onto a target substrate SUBB, and align particles dispersed (or distributed) in the ink 90, such as dipoles, on the target substrate SUBB. For example, the particles dispersed in the ink 90 may be sprayed onto the target substrate SUBB through the inkjet head 300 of the print head part 100. An electric field may be generated by the probe device 7000 on the target substrate SUBB onto which the ink 90 is sprayed, and the particles contained in the ink 90 may be aligned in a direction on the target substrate SUBB. In case that the printing process is not performed, ink 90 (e.g., a remaining portion of ink 90) supplied to the inkjet head 300 may not flow in the inkjet head 300, and the particles dispersed in the ink 90 may precipitate in the inkjet head 300. For example, in case that the ink 90 (e.g., a remaining portion of ink 90) does not flow (or is not agitated) in the inkjet head 300 for a while, the particles dispersed in the ink 90 (e.g., a remaining portion of ink 90) may precipitate in the inkjet head 300 by gravity.

A first direction DR1, a second direction DR2, and a third direction DR3 are defined in the drawings illustrating the inkjet printing apparatus 1000. The first direction DR1 and the second direction DR2 may be directions perpendicular to each other in a plane. The third direction DR3 may be a direction perpendicular to the plane on which the first direction DR1 and the second direction DR2 are located. Hereinafter, in the description of the inkjet printing apparatus 1000 of the embodiments, unless otherwise noted, the term "upward" refers to a side of the third direction DR3, and the term "top surface" refers to a surface toward the side of the third direction DR3. The term "downward" refers to another side of the third direction DR3, and the term "bottom surface" refers to a surface toward another side of the third direction DR3. Furthermore, "left", "right", "upper" and "lower" indicate directions in case that the inkjet printing apparatus 1000 is viewed from above (or in a plan view). For example, "right side" indicates a side of the first direction DR1, "left side" indicates another side of the first direction DR1, "upper side" indicates a side of the second direction DR2, and "lower side" indicates another side of the second direction DR2.

The target substrate SUBB may be provided on (or disposed on) the probe device 7000. The probe device 7000 may generate an electric field on the target substrate SUBB, and the particles contained (or included) in the ink 90 (e.g., a portion of ink 90) may be aligned such that specific ends (e.g., one end and another end) thereof are directed in a direction by the electric field.

The probe device 7000 may include a sub-stage 7100, a probe support 730, a probe part 750, and an aligner 780.

The sub-stage 7100 may provide a space in which the target substrate SUBB is disposed. The probe support 730, the probe part 750, and the aligner 780 may be disposed on the sub-stage 7100. The overall shape of the sub-stage 7100 may follow the shape of the target substrate SUBB in the plan view. For example, in case that the target substrate SUBB has a rectangular shape, the overall shape of the sub-stage 7100 may be a rectangular shape.

At least one aligner 780 may be disposed on the sub-stage 7100. The aligner 780 may be disposed on each side of the sub-stage 7100, and the area surrounded by the aligners 780 may be an area in which the target substrate SUBB is disposed.

The probe support 730 and the probe part 750 are disposed on the sub-stage 7100. The probe support 730 may provide a space in which the probe part 750 is disposed on the sub-stage 7100.

The probe part 750 may be disposed on the probe support 730 to generate an electric field on the target substrate SUBB prepared on the sub-stage 7100.

The stage STA may provide an area in which the probe device 7000 is disposed. The first moving part may adjust the relative position between the stage STA and the print head part 100. The first moving part may include the first and second rails RL1 and RL2.

The stage STA may be disposed on the first and second rails RL1 and RL2 extending in the second direction DR2. The stage STA may be disposed on the first and second rails RL1 and RL2 and reciprocate in the second direction DR2 to perform the printing process on the entire area of the target substrate SUBB.

The target substrate SUBB described in this specification, which is a target object of the inkjet printing apparatus 1000 according to an embodiment, may be any type of substrate such as an inorganic light emitting display device including an inorganic light emitting diode including an inorganic semiconductor, an organic light emitting display device including an organic light emitting diode including an organic light emitting layer, a micro LED display device including a micro LED, a quantum dot light emitting display device including a quantum dot light emitting diode including a quantum dot light emitting layer, or the like. In the following description, a case where the target substrate SUBB is the above-described inorganic light emitting display device including an inorganic light emitting diode is illustrated with reference to FIGS. 1 to 5. However, the disclosure is not limited thereto, and may be applied to other display devices as long as the same technical spirit is applicable.

The print head part 100 may print the ink 90 on the target substrate SUBB. The print head part 100 may spray the ink 90 onto the target substrate SUBB in case that the inkjet printing apparatus 1000 is driven. The print head part 100 may spray the ink 90 supplied from an ink supplier onto the target substrate SUBB provided on (disposed on) the sub-stage 7100.

The ink 90 sprayed from the print head part 100 may be in a solution state or a colloidal state. The ink 90 may contain (or include) a solvent 91 (refer to FIG. 9) and particles 95 (refer to FIG. 9) dispersed in the solvent 91. For example, the solvent 91 may be (or include) at least one of acetone, water, alcohol, toluene, propylene glycol (PG), propylene glycol methyl acetate (PGMA), triethylene glycol monobutyl ether (TGBE), diethylene glycol monophenyl ether (DGPE), an amide solvent, a dicarbonyl solvent, diethylene glycol dibenzoate, a tricarbonyl solvent, triethyl citrate, a phthalate solvent, benzyl butyl phthalate, bis(2-ethylhexyl) phthalate, bis(2-ethylhexyl) isophthalate, ethyl phthalyl ethyl glycolate, or the like, but is not limited thereto. The particles 95 dispersed in the solvent 91 may be provided to the print head part 100 by the ink supplier, and may be sprayed through the print head part 100. The particle 95 may be the inorganic light emitting diode made of the inorganic material described above with reference to FIG. 4, but is not limited thereto.

The print head part 100 may be disposed above the probe device 7000 or the stage STA. The print head part 100 may be mounted on the base frame 6000 and moved (or movable) with the base frame 6000. The base frame 6000 may include a first support 610 and a second moving part 630.

The print head part 100 may be mounted on (or connected to) the second moving part 630 disposed on the first support 610. The print head part 100 may be mounted on the second moving part 630 in various types, and the connection between the print head part 100 and the second moving part 630 is not particularly limited. For example, the print head part 100 may be disposed (e.g., directly disposed) on the second moving part 630. The print head part 100 may be mounted on or bonded to the second moving part 630 by an additional bonding member. For example, the print head part 100 may be disposed under the second moving part 630, but the position of the print head part 100 is not limited thereto.

The first support 610 may include a first horizontal support part 611 and a first vertical support part 612. The first horizontal support part 611 may extend in the first direction DR1 that is the horizontal direction, and the first vertical support part 612 may be connected to the first horizontal support part 611 and extend in the third direction DR3. The extension direction of the first horizontal support part 611 may be the same as the first direction DR1. The first direction DR1 may be perpendicular to the second direction DR2 that is a moving direction of the stage STA on the first and second rails RL1 and RL2 in a plan view. The print head part 100 may be mounted on (or disposed on) the second moving part 630, which is disposed on the first horizontal support part 611.

The second moving part 630 may move (or be movable) in a direction on the first horizontal support part 611. For example, the second moving part 630 may move in the extending direction (e.g., first direction DR1) of the first horizontal support part 611. The second moving part 630 may include a moving part 631 and a fixed part 632.

The moving part 631 of the second moving part 630 may move in the first direction DR1 on the first horizontal support part 611. The print head part 100 may be fixed to the fixed portion 632 of the second moving portion 630 and move in the first direction DR1 together with the second moving part 630. The stage STA may reciprocate in the second direction DR2 on the first and second rails RL1 and RL2. The print head part 100 having an area smaller than that of the target substrate SUBB may reciprocate in the first direction DR1 by the second moving part 630. Thus, the print head part 100 may spray the ink 90 (e.g., a portion of ink 90) to an area (e.g., the entire area) of the target substrate SUBB.

Although it is illustrated in the drawing that the stage STA moves in the second direction DR2 on the first and second rails RL1 and RL2, and the print head part 100 moves in the first direction DR1, the disclosure is not limited thereto. For example, the inkjet printing apparatus 1000 according to another embodiment may further include a horizontal moving part for moving the print head part 100 in the second direction DR2. The first and second rails RL1 and RL2 for moving the stage STA in the second direction DR2 may be omitted. For example, the stage STA may be fixed (e.g., directly fixed to a floor), and the print head part 100 may perform the printing process on the entire area of the target substrate SUBB while reciprocating in the first direction DR1 and the second direction DR2 on the stage STA. For example, the relative position between the stage STA and the print head part 100 may be adjusted by fixing the stage STA and moving the print head part 100 in the first and second directions DR1 and DR2 that are the horizontal directions, or may be adjusted by fixing the print head part 100 and moving the stage STA in the first and second directions DR1 and DR2 that are the horizontal directions.

Hereinafter, the stage STA may reciprocate in the second direction DR2 by the first moving part including the first and second rails RL1 and RL2, and the print head part 100 may reciprocate in the second direction DR2 by the second moving part 630 according to an example in the drawing. However, the method of adjusting the relative position between the stage STA and the print head part 100 is not limited thereto.

The print head part 100 may be mounted on the second moving part 630 disposed on the first support 610 and spaced apart from the stage STA by a predetermined distance in the third direction DR3. A height of the first vertical support part 612 of the first support 610 may be controlled, and the distance between the print head part 100 and the stage STA in the third direction DR3 may be adjusted (or controlled) by the height of the first vertical support part 612 of the first support 610. In case that the target substrate SUBB is disposed on the stage STA, the distance between the print head part 100 and the stage STA may be adjusted within a range, in which a space required for the printing process. For example, the print head part 100 may have a certain distance from the target substrate SUBB, and the printing process may be secured (or securely performed) between the print head part 100 and the stage STA.

The print head part 100 may include a first base portion 1100 and inkjet heads 300 located on a bottom surface of the first base portion 1100.

The first base portion 1100 may have a shape extending in a direction (e.g., first direction DR1). For example, the extension direction of the first base portion 1100 may be the same as the extension direction of the first horizontal support part 611. As shown in the drawing, the first base portion 1100 may have long sides extending in the first direction DR1 and short sides extending in the second direction DR2. However, the shape of the first base portion 1100 is not limited thereto.

The inkjet heads 300 may be disposed on a surface (e.g., bottom surface of first base portion 1100). The inkjet heads 300 may be spaced apart from each other. The inkjet heads 300 may be disposed in a direction (e.g., first direction DR1) and arranged in a column or multiple columns.

Although it is illustrated in the drawing that the inkjet heads 300 are arranged in two columns and inkjet heads 300 in the respective columns are arranged to be misaligned, the disclosure is not limited thereto. For example, the inkjet heads 300 may be arranged in a larger number of columns, and the inkjet heads 300 disposed in the respective columns may overlap without being misaligned. In an embodiment, the number of inkjet heads 300 disposed in one print head part 100 may be 128 to 1,800, but the disclosure is not limited thereto. The inkjet head 300 may have various shapes in a plan view and is not particularly limited. For example, the inkjet head 300 may have a quadrangular shape, a quadrilateral shape, or the like in the plan view.

Figure 9:
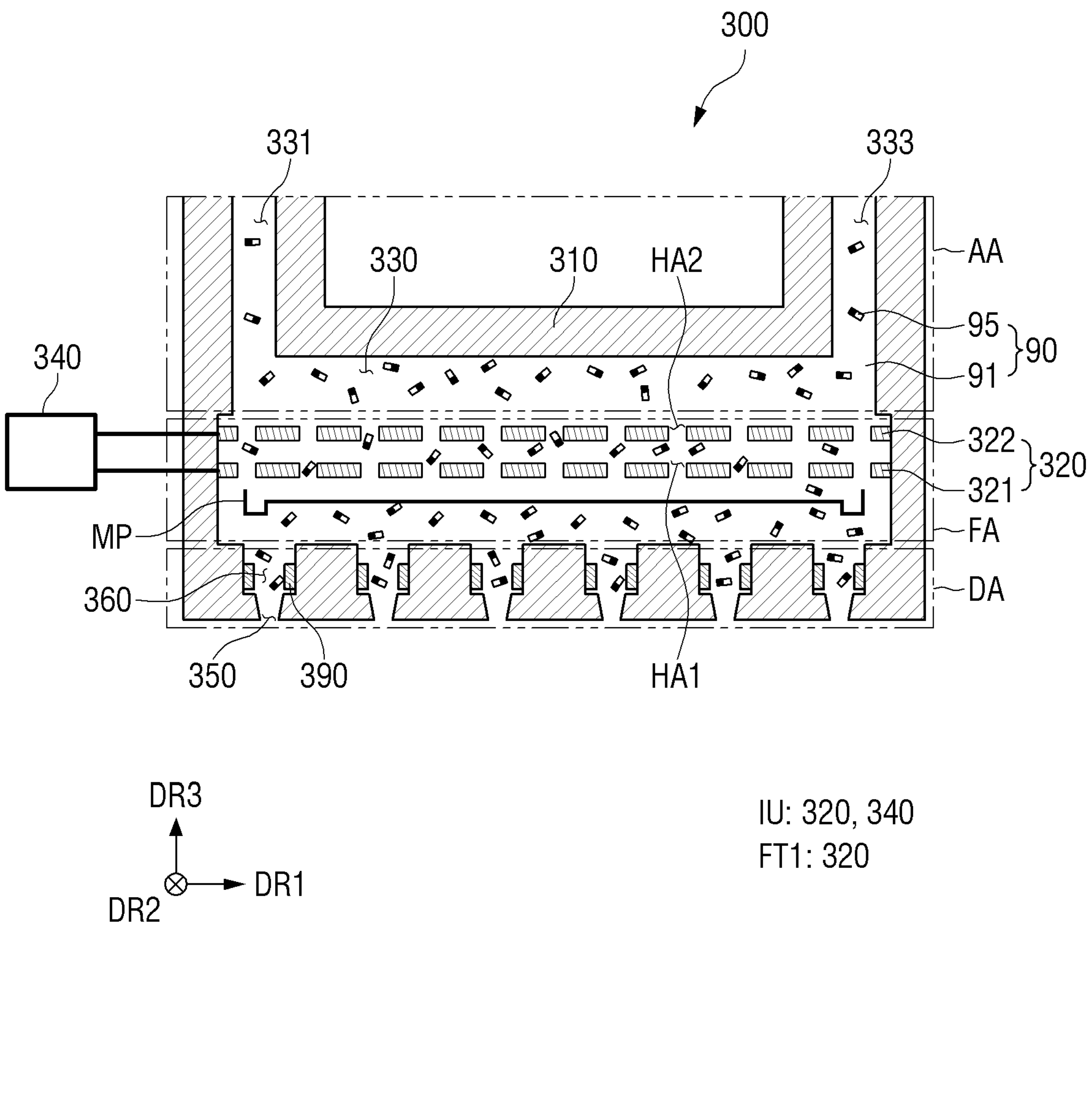
FIG. 9 is a schematic cross-sectional view of an inkjet head according to an embodiment.

FIG. 9 is a schematic cross-sectional view of an inkjet head according to an embodiment.

Referring to FIGS. 8 and 9, the inkjet head 300 according to an embodiment may include a head base 310, an inner tube 330, nozzles 350, and an electric field generating part IU. The inkjet head 300 may further include a piezoelectric element 390 and a guide plate MP.

The head base 310 may be a part forming a main body of the inkjet head 300. The head base 310 may have a shape extending in a direction (e.g., first direction DR1). The extension direction of the head base 310 may be the same as the extension direction of the first horizontal support part 611 of the first support 610.

The inkjet head 300 may include an ink moving part AA, an ejection part DA, and a filter part FA.

The ink moving part AA may be a part of the inkjet head 300. The ink moving part AA may receive the ink 90 from the first base portion 1100. The ink moving part AA may move an ink 90 (e.g., a portion of ink 90) to the ejection part DA or provide ink 90 (e.g., a remaining portion of ink 90) that is not ejected from the ejection part DA to the first base portion 1100. For example, the ink moving part AA may be a portion of the head base 310 that is disposed between the first base portion 1100 and the ejection part DA. The ink moving part AA may provide a path through which the ink 90 (e.g., a portion of ink 90) moves and the remaining ink 90 circulates.

The inner tube 330 may be disposed at (or disposed in) the ink moving part AA. The inner tube 330 may be formed in the extension direction of the head base 310. The inner tube 330 may be disposed in the head base 310 and connected to an inner flow path of the first base portion 1100. The ink 90 supplied through the first base portion 1100 may flow into the inner tube 330 through an inlet 331 of the inner tube 330, and flow along the inner tube 330. A portion of the ink 90 flowing along the inner tube 330 may be sprayed through the nozzle 350 of the ejection part DA via a filter portion FA, and another portion of the ink 90 (e.g., a remaining portion of ink 90) flowing along the inner tube 330 may flow to the first base portion 1100 through an outlet 333 of the inner tube 330. For example, the inner tube 330 may move the ink 90 provided from the inner flow path of the first base portion 1100 to the ejection part DA, or collect (e.g., reuse or recycle) the ink 90 (e.g., a remaining portion of ink 90) that is not ejected from the ejection part DA into the inner flow path of the first base portion 1100. The inlet 331 of the inner tube 330 may be located at (or disposed on) one end of the inner tube 330, and the outlet 333 of the inner tube 330 may be located at (or disposed on) the opposite side (or another end) of the inlet 331 of the inner tube 330.

The ejection part DA may be a part of the inkjet head 300 from which the ink 90 is ejected. The nozzles 350, a piezo chamber 360, and the piezoelectric element 390 may be disposed at (or included in) the ejection part DA.

The nozzles 350 may be disposed at (or included in) the ejection part DA. The ejection part DA may be located on a surface, e.g., the bottom surface of the head base 310. The nozzles 350 may be arranged in the extension direction of the head base 310. The nozzles 350 may be spaced apart from each other, and may be connected to the filter part FA of the head base 310 through the piezo chamber 360. The piezo chamber 360 may penetrate the ejection part DA, which is disposed under the head base 310.

The nozzle 350 may eject the ink 90 that has passed through the filter part FA along the inner tube 330 and flown into the piezo chamber 360. For example, the ink 90 may pass through the inner tube 300, the piezo chamber 360, and the nozzle 350 in the stated order. A spray amount of the ink 90 through each nozzle 350 may be adjusted by a voltage applied to the piezoelectric element 390. The piezoelectric element 390 may be disposed in the piezo chamber 360 disposed on each nozzle 350. The ink 90 may be sprayed through the nozzle 350 by the pressure caused by the voltage applied to the piezoelectric element 390 disposed in each nozzle 350 and applied to the ink 90 in the area around the nozzle 350. For example, in a non-spray mode, the piezoelectric element 390 of the inkjet head 300 may adjust the pressure in the piezo chamber 360, and the pressure in the piezo chamber 360 may be equal to a pressure outside the inkjet head 300. Thus, the piezoelectric element 390 may prevent the ink 90 from being sprayed through the nozzle 350 in the non-spray mode. However, in a spray mode, the piezoelectric element 390 of the inkjet head 300 may adjust the pressure in the piezo chamber 360, and the pressure in the piezo chamber 360 may be greater than the pressure outside the inkjet head 300. Thus, the piezoelectric element 390 may spray the ink 90 through the nozzle 350.

The piezo chamber 360 may be disposed between the nozzle 350 and the filter part FA, and temporarily store the ink 90 before the ink 90 is ejected through the nozzle 350. In case that the pressure is applied to the ink 90 located in the piezo chamber 360 by the piezoelectric element 390, the ink 90 may be ejected through the nozzle 350. The piezo chamber 360 may be connected to a lower portion of the inner tube 330, and correspond to (or connected to) each of the nozzles 350.

The filter part FA may be disposed between the ink moving part AA and the ejection part DA. For example, the filter part FA may be disposed between the inner tube 330 and the piezo chamber 360. The filter part FA may be a part of the inkjet head 300. The filter part FA may remove impurities from the ink 90, which flows from the ink moving part AA toward the nozzle 350, or guide the flow of the ink 90. The filter part FA may generate a flow of the ink 90 in the non-spray mode to prevent the particles 95 of the ink 90 remaining in the inkjet head 300 from precipitating in the non-spray mode. For example, the filter part FA may make the flow of (or agitate) the ink 90 in the non-spray mode to prevent the precipitation of the particles 95.

A first filter FT1 may be disposed on the filter part FA. The guide plate MP may be further disposed on the filter part FA.

The first filter FT1 may be disposed between the inner tube 330 and the piezo chamber 360. The first filter FT1 may include holes to selectively transmit the particles 95 in the ink 90 and block materials (or impurities) other than the particles 95 in the ink 90. For example, the first filter FT1 may prevent the materials (or impurities) other than the particles 95 from flowing into the ejection part DA in case that the ink 90 flows along the inner tube 330 into the piezo chamber 360 of the ejection part DA. Accordingly, the first filter FT1 may prevent the nozzle 350 from being clogged by the impurities, and the impurities may not be mixed with the ink 90 ejected through the nozzle 350.

As described above, the inkjet head 300 may include the electric field generating part IU. The electric field generating part IU may include an electric field generating electrode 320 and a voltage applying device 340. The electric field generating part IU may generate an electric field in the inkjet head 300 to guide the flow of the ink 90.

The electric field generating electrode 320 may be disposed in the filter part FA. The electric field generating electrode 320 may be disposed in the filter part FA. The voltage applying device 340 may apply an electrical signal to the electric field generating electrode 320, and the electric field generating electrode 320 may generate the electric field by the electrical signal transmitted from the voltage applying device 340.

In an embodiment, the electric field generating electrode 320 may constitute the first filter FT1. For example, the electric field generating electrode 320 may form at least part of the first filter FT1. The electric field generating electrode 320 may include a first electric field generating electrode 321 and a second electric field generating electrode 322. The first electric field generating electrode 321 and the second electric field generating electrode 322 may constitute the first filter FT1. For example, the first electric field generating electrode 321 and the second electric field generating electrode 322 may form at least part of the first filter FT1. In the embodiment, the first electric field generating electrode 321 may be a first electrode filter 321, and the second electric field generating electrode 322 may be a second electrode filter 322. Hereinafter, for simplicity of description, in this specification, the first electric field generating electrode 321 may be referred to as the first electrode filter 321, and the second electric field generating electrode 322 may be referred to as the second electrode filter 322.

The first electric field generating electrode 321 may be disposed above the ejection part DA. The second electric field generating electrode 322 may be disposed above the first electric field generating electrode 321 and spaced apart from the first electric field generating electrode 321 in the third direction DR3. The second electric field generating electrode 322 may overlap the first electric field generating electrode 321 in the third direction DR3.

The first electric field generating electrode 321 may include first holes HAL The second electric field generating electrode 322 may include second holes HA2. The particles 95 in the ink 90 may pass through the first hole HA1 and the second hole HA2.

The first electric field generating electrode 321 and the second electric field generating electrode 322 may receive an electrical signal from the voltage applying device 340. In case that the electrical signal is applied from the voltage applying device 340 to each of the first electric field generating electrode 321 and the second electric field generating electrode 322, an electric field may be generated between the first electric field generating electrode 321 and the second electric field generating electrode 322.

The guide plate MP may be disposed between the first filter FT1 and the piezo chamber 360. For example, the guide plate MP may be disposed in the filter part FA and disposed below the first filter FT1. The guide plate MP may guide the flow of the ink 90, and the amount of the ink 90 flowing into the piezo chambers 360 may be uniform.

Figure 10:
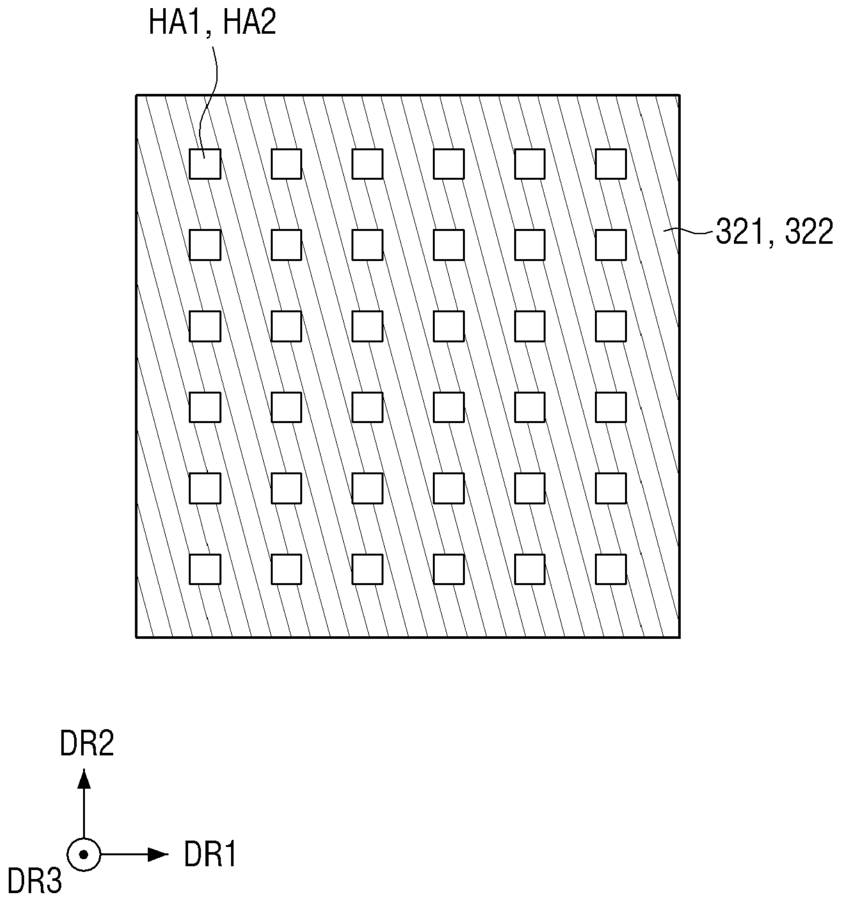
FIG. 10 is a schematic plan view of first and second electric field generating electrodes according to an embodiment.
Figure 11:
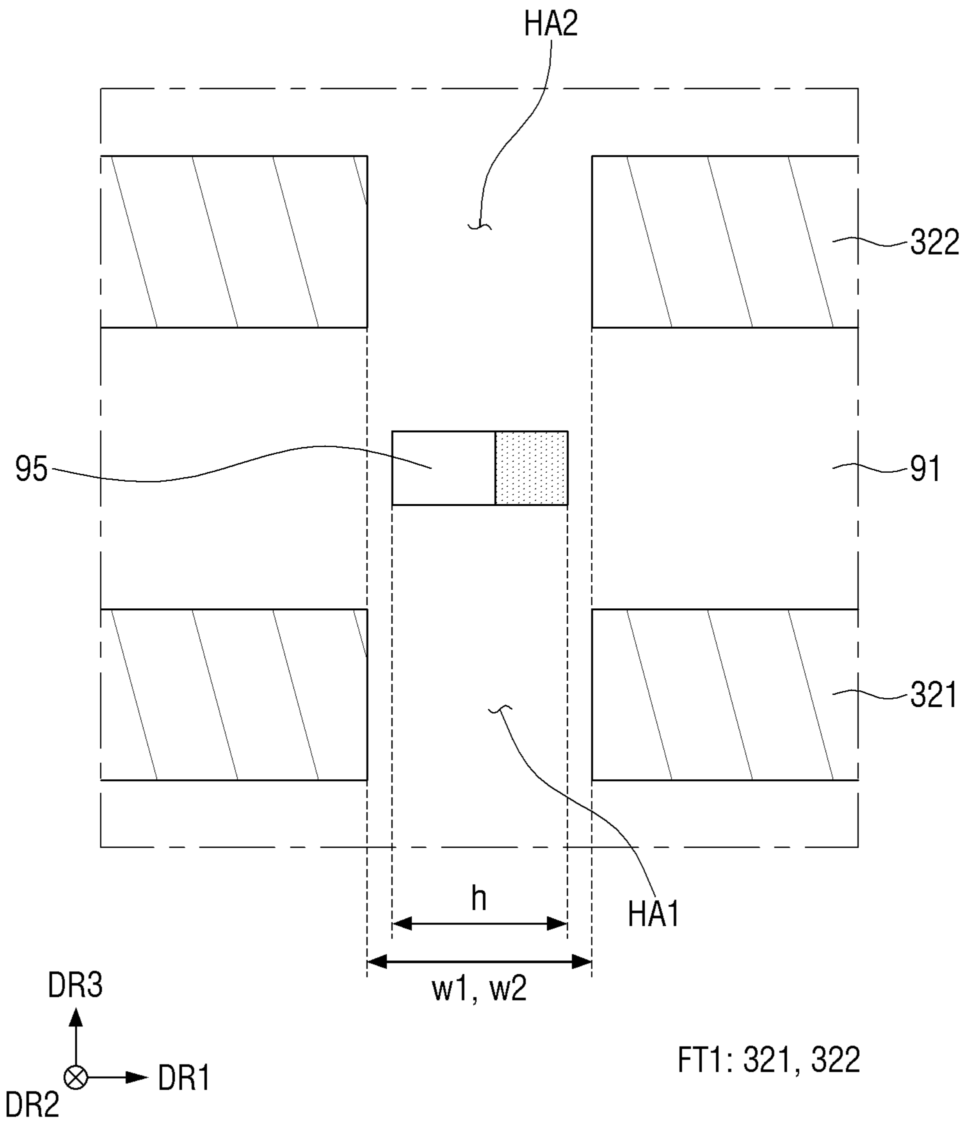
FIG. 11 is a schematic cross-sectional view for comparing the sizes of a particle and holes of the first and second electric field generating electrodes according to an embodiment.

FIG. 10 is a schematic plan view of first and second electric field generating electrodes according to an embodiment. FIG. 11 is a schematic cross-sectional view for comparing the sizes of particles and holes of the first and second electric field generating electrodes according to an embodiment.

Referring to FIGS. 10 and 11, the first electric field generating electrode 321 and the second electric field generating electrode 322 may overlap each other in the third direction DR3. The first electric field generating electrode 321 and the second electric field generating electrode 322 may have a same shape in a plan view. For example, the first electric field generating electrode 321 and the second electric field generating electrode 322 may overlap each other in the third direction DR3, and may have the same shape in a plan view. For example, the first electric field generating electrode 321 and the second electric field generating electrode 322 may have a mesh shape in a plan view.

The first electric field generating electrode 321 may include the first holes HA1 penetrating the first electric field generating electrode 321. The first holes HA1 may be spaced apart from each other. The first holes HA1 may be arranged in a quadrangular shape, a quadrilateral matrix shape, a square shape, or the like in a plan view. However, the shape of the first hole HA1 is not limited thereto.

The second electric field generating electrode 322 may include the second holes HA2 penetrating the second electric field generating electrode 322. The second holes HA2 may be spaced apart from each other. The second holes HA2 may be arranged in a quadrangular shape, a quadrilateral matrix shape, a square shape, or the like in a plan view. However, the shape of the second hole HA2 is not limited thereto.

The first hole HA1 and the second hole HA2 may have the same shape in a plan view. Therefore, a first width W1 of the first hole HA1 in the first direction DR1 and a second width W2 of the second hole HA2 in the first direction DR1 may be the same. Although the first holes HA1 and the second holes HA2 have a square shape in a plan view (e.g., refer to FIG. 10), the disclosure is not limited thereto. For example, the first holes HA1 and the second holes HA2 may have a circular shape in a plan view. The first holes HA1 and the second holes HA2 may overlap each other in the third direction DR3.

As described above, the first electric field generating electrode 321 and the second electric field generating electrode 322 may constitute the first filter FT1. The particle 95 in the ink 90 may have a length 'h' smaller than the first width W1 of the first hole HA1 and the second width W2 of the second hole HA2. Thus, the particle 95 may pass through the first filter FT1 (e.g., first electric field generating electrode 321 and second electric field generating electrode 322). For example, the particles 95 may pass through the first holes HA1 of the first electric field generating electrode 321 and the second holes HA2 of the second electric field generating electrode 322. Therefore, the particle 95 in the ink 90 may pass through the first electric field generating electrode 321 and the second electric field generating electrode 322 constituting the first filter FT1.

Figure 12:
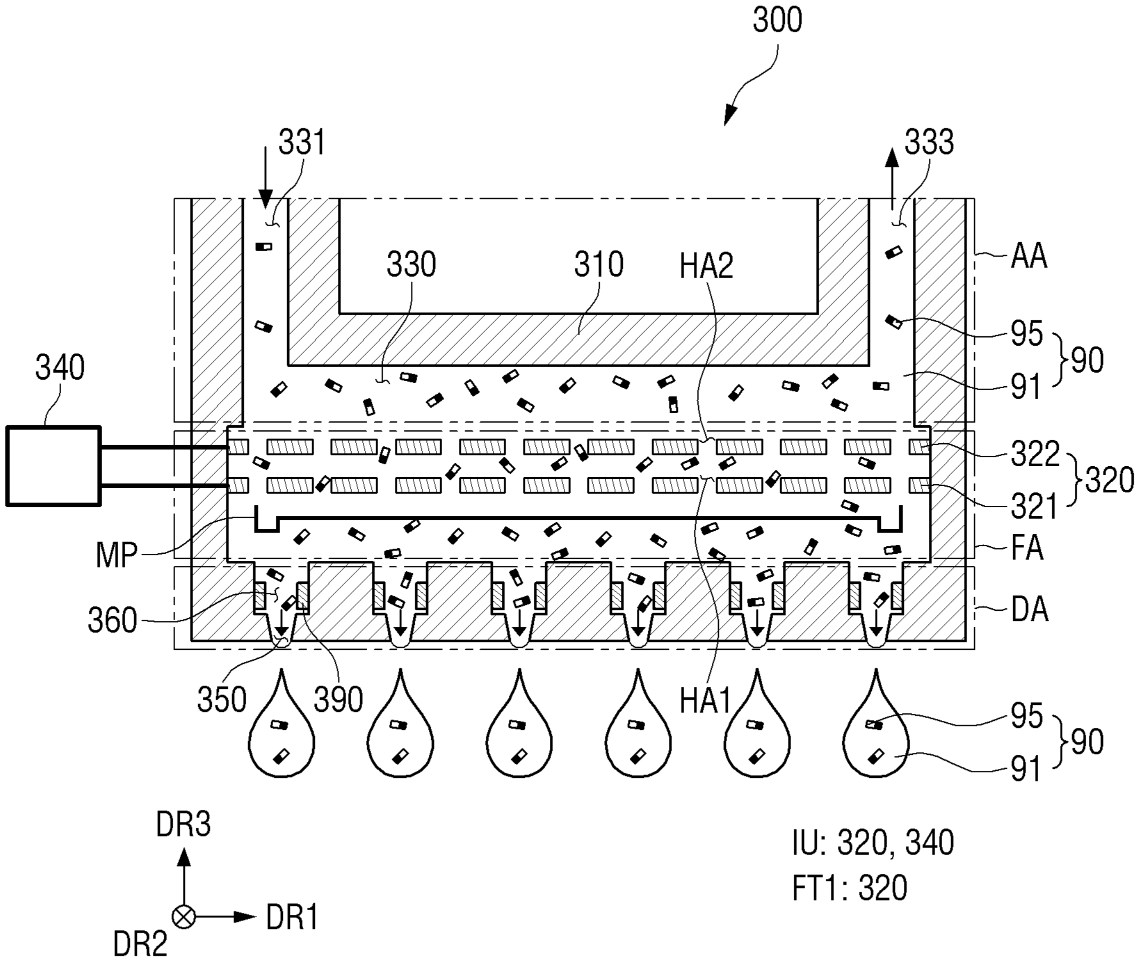
FIGS. 12 and 13 are schematic cross-sectional views showing the operation of an inkjet head according to an embodiment.
Figure 13:
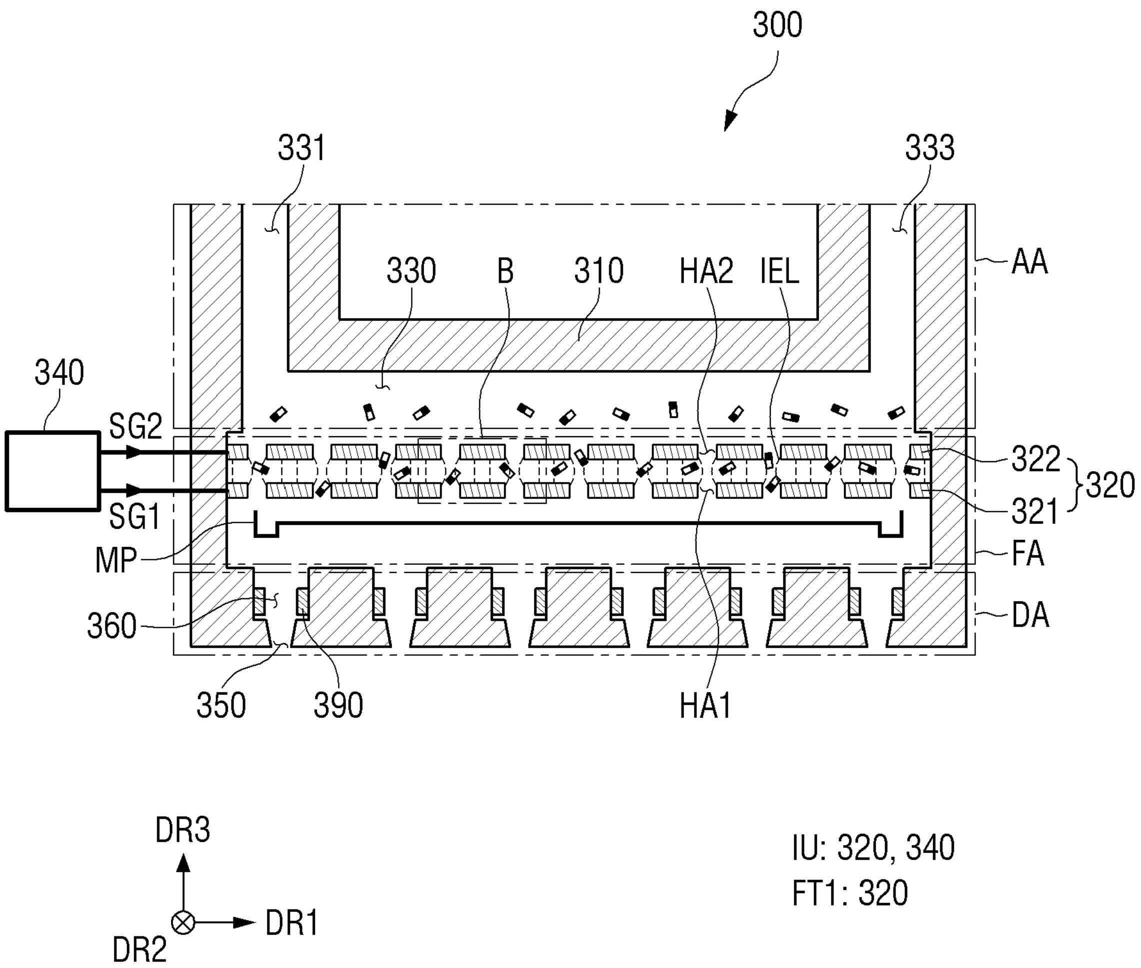
Figure 14:
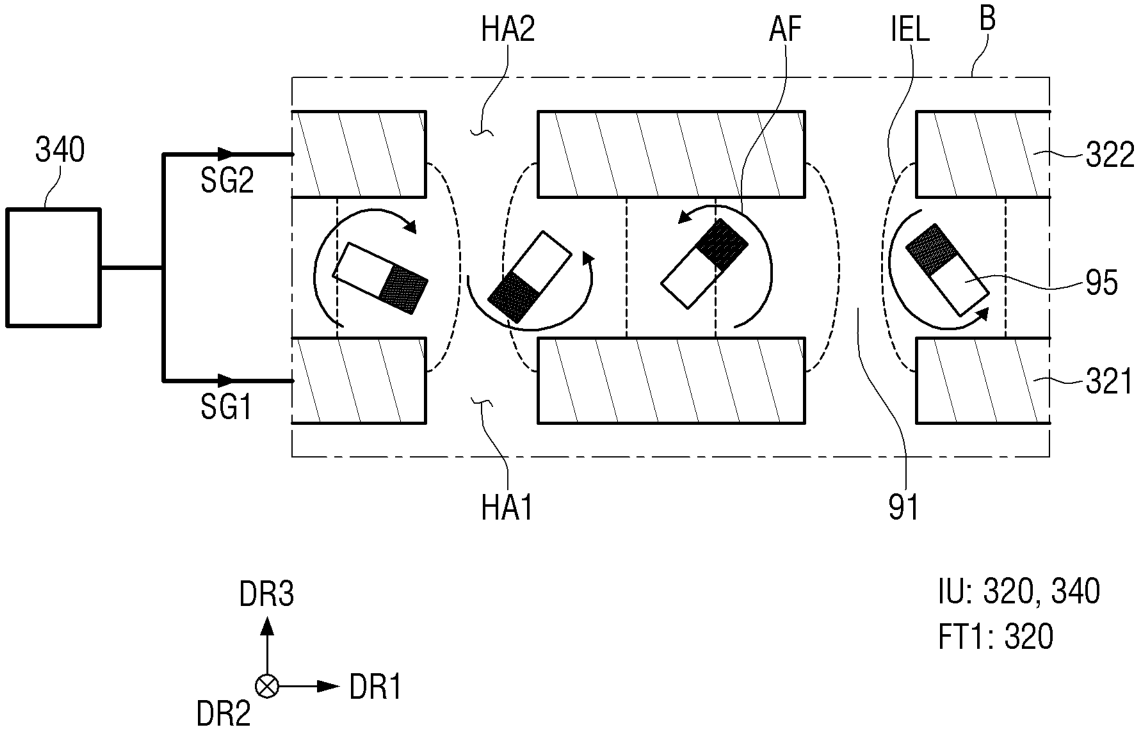
FIG. 14 is an enlarged view schematically showing an enlarged example of area B of FIG. 13.

FIGS. 12 and 13 are schematic cross-sectional views showing the operation of an inkjet head according to an embodiment. FIG. 14 is an enlarged view schematically showing an enlarged example of area B of FIG. 13.

FIG. 12 schematically shows the operation of the inkjet head 300 in the spray mode, and FIG. 13 schematically shows the operation of the inkjet head 300 in the non-spray mode. For example, in the spray mode, the ink 90 may be provided from the outside of the inkjet head 300 and be ejected through the nozzles 350. In the non-spray mode, the ink 90 may not be provided from the outside of the inkjet head 300 and not be ejected through the nozzles 350. As described above, in the non-spray mode, the piezoelectric element 390 may adjust the pressure in the inkjet head 300, and the pressure in the inkjet head 300 may be equal to the pressure outside the inkjet head 300. Thus, the ink 90 may not be sprayed through the nozzle 350 in the non-spray mode. In the spray mode, the piezoelectric element 390 may adjust the pressure in the inkjet head 300, and the pressure in the inkjet head 300 may be greater than the pressure outside the inkjet head 300. Thus, the ink 90 may be sprayed through the nozzle 350 in the spray mode.

Referring to FIG. 12, in the spray mode, the ink 90 may be provided from the outside of the inkjet head 300 into the inkjet head 300 through the inlet 331 of the inner tube 330. The ink 90 may flow along the inner tube 330 from the inlet 331 toward the outlet 333 of the inner tube 330. For example, the ink 90 may flow through the inlet 331, the inner tube 330, and the outlet 333 in sequence. A part of the ink 90 flowing along the inner tube 330 may pass through the electric field generating electrode 320 constituting the first filter FT1, and flow into the filter part FA. Another part of the ink 90 flowing along the inner tube 330 may be collected (e.g., reused or recycled) to the outside of the inkjet head 300 through the outlet 333 of the inner tube 330.

The ink 90 may pass through the electric field generating electrode 320 constituting the first filter FT1, and impurities may be removed from the ink 90. For example, the electric field generating electrode 320 may form at least part of the first filter FT1. The ink 90 with the impurities removed may uniformly flow into the piezo chambers 360 by the guide plate MP. The piezoelectric element 390 may generate the pressure (e.g., hydraulic pressure) in the piezo chamber 360. The ink 90 (e.g., a portion of ink 90) flowing into the piezo chamber 360 may be discharged (or ejected) from the piezo chamber 360 to the outside of the inkjet head 300 through each nozzle 350.

In the spray mode, the voltage applying device 340 may not transmit the electrical signal to each of the first electric field generating electrode 321 and the second electric field generating electrode 322. Therefore, in the spray mode, the electric field may not be generated between the first electric field generating electrode 321 and the second electric field generating electrode 322. For example, in the spray mode, the first electric field generating electrode 321 and the second electric field generating electrode 322 may function as a filter (or electrode filter) for blocking (or filtering) the impurities from the ink 90. The first electric field generating electrode 321 and the second electric field generating electrode 322 may not have a function of generating an electric field in the ink 90.

Referring to FIGS. 13 and 14, in the non-spray mode, the ink 90 may not be provided from the outside of the inkjet head 300 into the inkjet head 300. Therefore, in the non-spray mode, the ink 90 may not flow along the inner tube 330 disposed above (or disposed on) the filter part FA. In another embodiment, in case that the ink 90 remaining in the inkjet head 300 does not flow in the non-spray mode, the particles 95 dispersed in the ink 90 may precipitate or settle in the ink 90 because the particles 95 contain (or include) a material having a relatively higher specific gravity than that of the solvent 91. In this case, the particles 95 may settle or precipitate in the piezo chamber 360 located at (or disposed on) the lower portion of the inkjet head 300 inside the inkjet head 300, and the nozzle 350 may be clogged by the remaining particles 95. The electric field generating part IU according to the embodiment may generate the flow of the ink 90 (e.g., a remaining portion of ink 90) inside the inkjet head 300 (e.g., the filter part FA) in the non-spray mode to prevent the particles 95 in the remaining ink 90 (e.g., a remaining portion of ink 90) from settling or precipitating in the piezo chamber 360 and prevent the nozzle 350 from being clogged. For example, the electric field generating part IU may make the flow of (or agitate) the ink 90 (e.g., a remaining portion of ink 90) in the non-spray mode to prevent the settlement or precipitation of the particles 95.

For example, in the non-spray mode, the electric field generating part IU may generate an electric field IEL in the inkjet head 300. The voltage applying device 340 may apply a first electrical signal SG1 and a second electrical signal SG2 to the first electric field generating electrode 321 and the second electric field generating electrode 322 constituting the first filter FT1, respectively. In an embodiment, the first electrical signal SG1 may be an electrical signal of a ground voltage, and the ground voltage may be applied to the first electric field generating electrode 321. The second electrical signal SG2 may be an electrical signal of an AC voltage, and the AC voltage may be applied to the second electric field generating electrode 322. However, the disclosure is not limited thereto. For example, in another embodiment, the second electrical signal SG2 may be an electrical signal of the AC voltage, and the AC voltage may be applied to the second electric field generating electrode 322. The first electrical signal SG1 applied to the first electric field generating electrode 321 may not be an electrical signal of the ground voltage, and the ground voltage may not be applied to the first electric field generating electrode 321. In another embodiment, the first electrical signal SG1 may be an electrical signal of the AC voltage, and the AC voltage may be applied to the first electric field generating electrode 321. The second electrical signal SG2 may be an electrical signal of the ground voltage, and the ground voltage may be applied to the second electric field generating electrode 322.

In case that the first electrical signal SG1 is applied to the first electric field generating electrode 321 and the second electrical signal SG2 is applied to the second electric field generating electrode 322, the electric field IEL may be generated between the first electric field generating electrode 321 and the second electric field generating electrode 322. A direction of the electric field IEL may be substantially parallel to a direction (e.g., third direction DR3) in which the first electric field generating electrode 321 and the second electric field generating electrode 322 are spaced apart from each other. The electric field IEL generated between the first electric field generating electrode 321 and the second electric field generating electrode 322 may generate a flow AF of the ink 90 (e.g., some of remaining portion of ink 90) disposed between the first electric field generating electrode 321 and the second electric field generating electrode 322. For example, the electric field IEL may be applied to the particles 95 to form the flow AF of (or agitate) the ink 90 (e.g., some of remaining portion of ink 90). In the non-spray mode, due to the flow AF of the ink 90 disposed between the first electric field generating electrode 321 and the second electric field generating electrode 322, the ink 90 disposed between the first electric field generating electrode 321 and the second electric field generating electrode 322 and the ink 90 remaining in other areas inside the inkjet head 300 may flow. Accordingly, the particles 95 in the ink 90 may move together with the ink 90 by the flow of the ink 90. Therefore, even in case that the inflow of the ink 90 is blocked in the non-spray mode, the ink 90 remaining in the inkjet head 300 flows by the electric field generating unit IU, which makes it possible to prevent the particles 95 in the remaining ink 90 from settling or precipitating in the piezo chamber 360 and prevent the nozzle 350 from being clogged. In the non-spray mode, the ink 90 (e.g., a remaining portion of ink 90) may circulate in the inkjet head 300 by the flow AF of the ink 90 (e.g., some of remaining portion of ink 90), thereby removing bubbles that may be generated in the inkjet head 300.

In the non-spray mode, the electric field generating part IU may have two functions (e.g., function of generating flow AF and function of filtering). For examples, the electric field generating part IU may have the function of generating the flow AF of the ink 90 (e.g., a remaining portion of ink 90) remaining in the inkjet head 300 by generating the electric field IEL between the first electric field generating electrode 321 and the second electric field generating electrode 322 by transmitting the first electrical signal SG1 and the second electrical signal SG2 to the first electric field generating electrode 321 and the second electric field generating electrode 322, respectively. For example, In the non-spray mode, the first electrical signal SG1 and the second electrical signal SG2 may be applied to the first electric field generating electrode 321 and the second electric field generating electrode 322, respectively, and the electric field generating part IU may generate the electric field IEL between the first electric field generating electrode 321 and the second electric field generating electrode 322 to generate the flow AF of the ink 90 (e.g., some of remaining portion of ink 90). Also, the electric field generating part IU may function as the filter (or electrode filter) for blocking the inflow of impurities in the ink 90 from the inner tube 330 into the filter part FA due to the flow AF of the ink 90 generated by the electric field generating unit IU.

Figure 15:
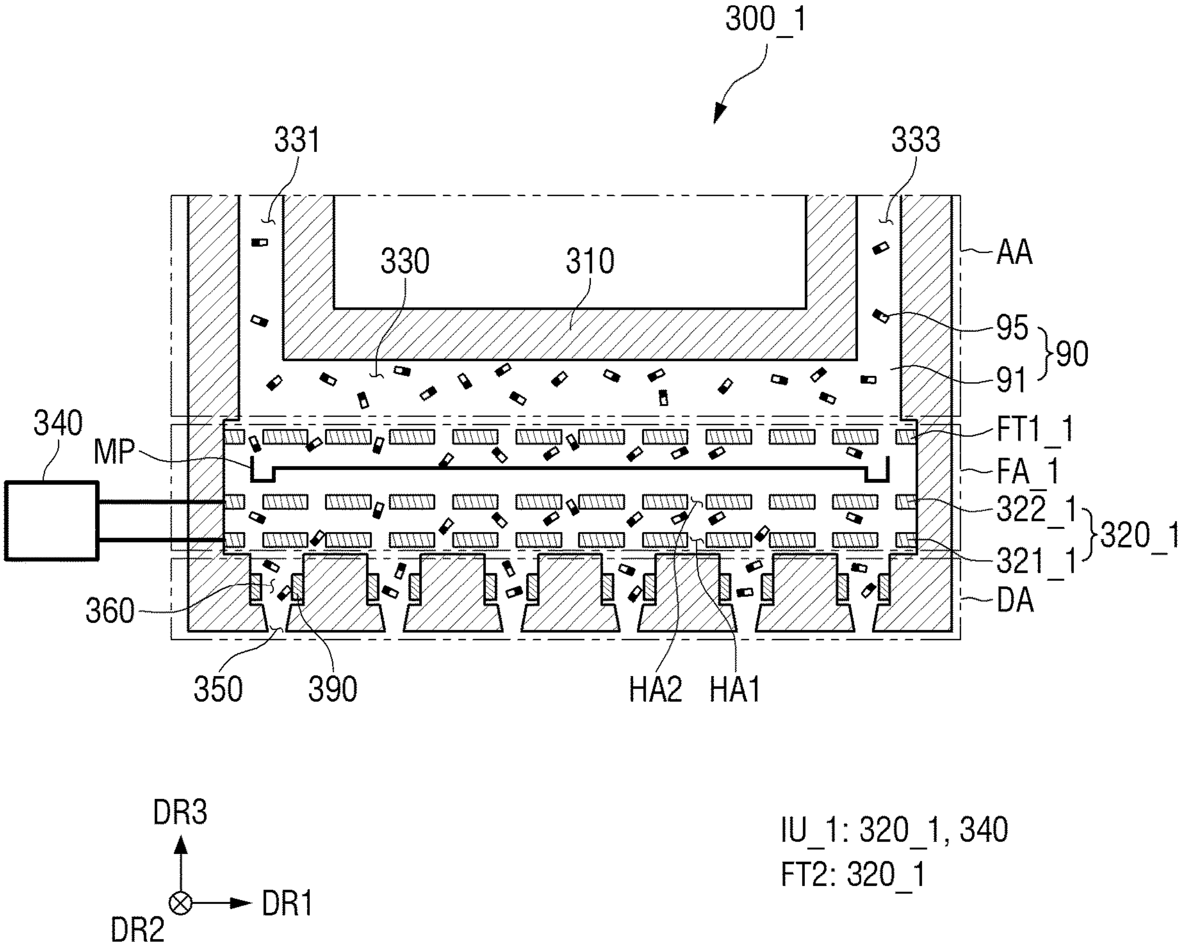
FIG. 15 is a schematic cross-sectional view of an inkjet head according to an embodiment.

FIG. 15 is a schematic cross-sectional view of an inkjet head according to an embodiment.

Referring to FIG. 15, an inkjet head 300_1 according to the embodiment is different from an inkjet head 300 of FIG. 9 in that an electric field generating electrode 320_1 disposed at (or disposed in) a filter part FA_1 is disposed between a guide plate MP and an ejection part DA to constitute a second filter FT2 without constituting a first filter FT1_1. For example, the first filter FT1_1 may be separated from the second filter FT2.

For example, the inkjet head 300_1 according to the embodiment may include the first filter FT_1 and the second filter FT2 disposed at (or disposed in) the filter part FA_1. For example, the filter part FA_1 may include the first filter FT1_1 and the second filter FT2.

The first filter FT1_1 may be disposed above the guide plate MP in the filter part FA_1. For example, the first filter FT1_1 may be disposed between the guide plate MP and an inner tube 330. The first filter FT1_1 may include holes and block impurities in the ink 90 flowing from the inner tube 330 into the filter part FA_1. The first filter FT1_1 may be formed as a single plate.

The second filter FT2 may be disposed below the guide plate MP in the filter part FA_1. For example, the second filter FT2 may be disposed between the guide plate MP and a piezo chamber 360 disposed at (or disposed in) the ejection part DA.

In the embodiment, the electric field generating electrode 320_1 of an electric field generating part IU_1 may constitute the second filter FT2. For example, a first electric field generating electrode 321_1 may be disposed between the guide plate MP and the piezo chamber 360, and a second electric field generating electrode 322_1 may be disposed between the guide plate MP and the first electric field generating electrode 321_1. The electric field generating electrode 320_1 according to the embodiment may have a same function and a same shape as those of the electric field generating electrode 320 of FIG. 9 except that the electric field generating electrode 320_1 constitutes the second filter FT2 disposed below the guide plate MP. Thus, repetitive descriptions will be omitted.

The electric field generating electrode 320_1 according to the embodiment may be disposed adjacent (or close) to the ejection part DA, and disposed between the guide plate MP and the ejection part DA. Thus, the ink 90 (e.g., a remaining portion in piezo chamber 360) may readily flow in the non-spray mode. Therefore, it is possible to more effectively prevent the particles 95 in the ink 90 from settling or precipitating in the lower portion of the piezo chamber 360, thereby more effectively preventing the nozzle 350 from being clogged.

Figure 16:
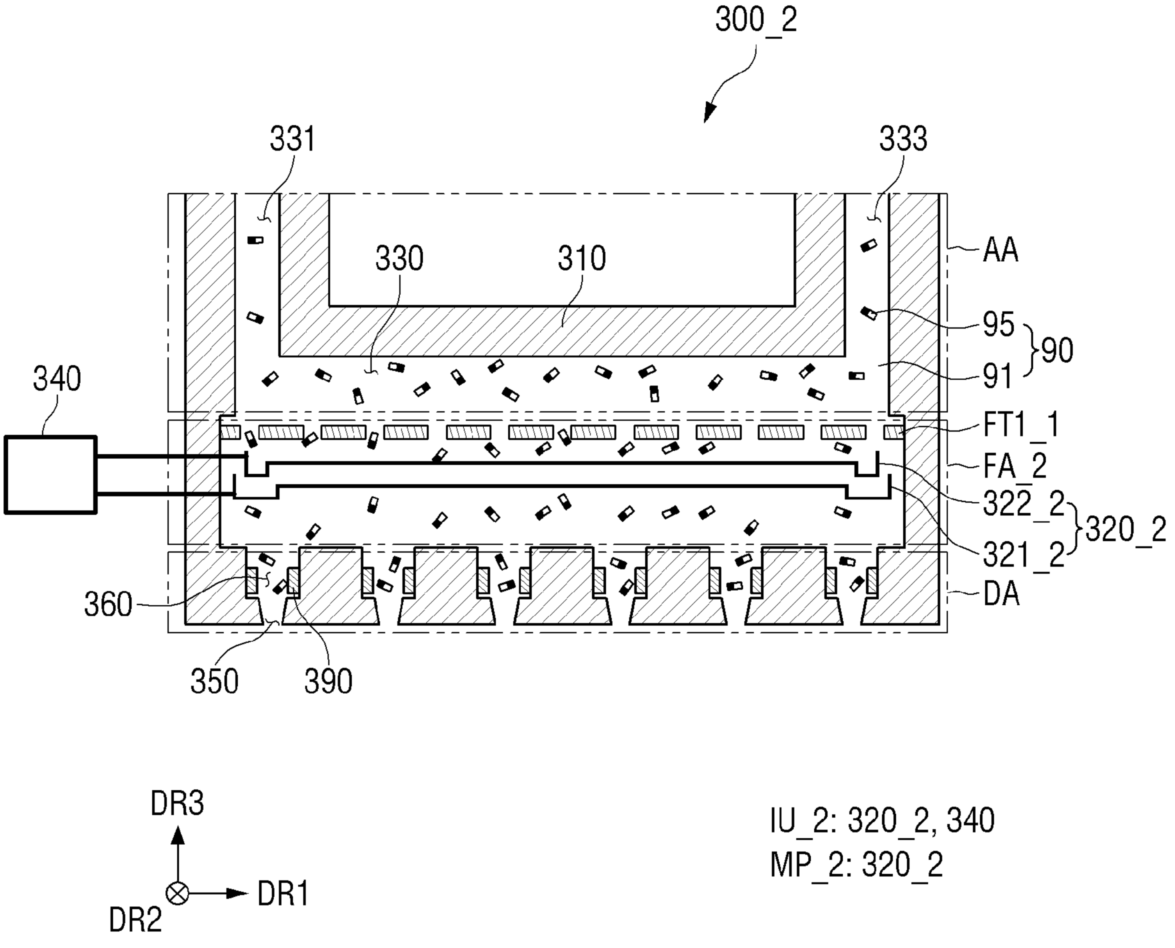
FIG. 16 is a schematic cross-sectional view of an inkjet head according to an embodiment.

FIG. 16 is a schematic cross-sectional view of an inkjet head according to an embodiment.

Referring to FIG. 16, an inkjet head 300_2 according to the embodiment is different from an inkjet head 300_1 of FIG. 15 in that an electric field generating electrode 320_2 disposed on a filter part FA_2 forms (or constitutes) a guide plate MP_2.

For example, the electric field generating electrode 320_2 of an electric field generating part IU_2 according to the embodiment may constitute the guide plate MP_2. For example, the electric field generating electrode 320_2 may form at least part of the guide plate MP_2. The electric field generating electrode 320_2 of the electric field generating part IU_2 constituting the guide plate MP_2 may be disposed between a first filter FT1_1 and an ejection part DA. For example, a first electric field generating electrode 321_2 may be disposed between the first filter FT1_1 and a piezo chamber 360, and a second electric field generating electrode 322_2 may be disposed between the first filter FT1_1 and the first electric field generating electrodes 321_2.

A hole may not be formed in the first electric field generating electrode 321_2 and the second electric field generating electrode 322_2. For example, each of the first electric field generating electrode 321_2 and the second electric field generating electrode 322_2 may be an electrode plate having no holes.

In concluding the detailed description, those skilled in the art will appreciate that many variations and modifications can be made to the embodiments without substantially departing from the principles of the disclosure. Therefore, the disclosed embodiments of the disclosure are used in a generic and descriptive sense only and not for purposes of limitation.

What is claimed is:

1. An inkjet printing apparatus comprising:

a stage on which a target substrate is mounted; and an inkjet head positioned above the stage, wherein the inkjet head includes:

an ejection part including a plurality of nozzles that spray ink containing a plurality of particles;

a filter part disposed above the ejection part and selectively passing the plurality of particles; and an electric field generating electrode that is disposed in the filter part and generates an electric field in the filter part, wherein the electric field generating electrode includes:

a first electric field generating electrode; and a second electric field generating electrode spaced apart from the first electric field generating electrode, and wherein the second electric field generating electrode is disposed above the first electric field generating electrode and overlaps the first electric field generating electrode in a plan view.

2. The inkjet printing apparatus of claim 1, wherein the first electric field generating electrode includes a plurality of first holes spaced apart from each other, and the second electric field generating electrode includes a plurality of second holes spaced apart from each other.

3. The inkjet printing apparatus of claim 2, wherein each of a diameter of each of the plurality of first holes and a diameter of each of the plurality of second holes is greater than a length of each of the plurality of particles.

4. The inkjet printing apparatus of claim 2, wherein the plurality of first holes overlap the plurality of second holes in a plan view.

5. The inkjet printing apparatus of claim 1, wherein the electric field is generated between the first electric field generating electrode and the second electric field generating electrode.

6. The inkjet printing apparatus of claim 1, wherein the electric field generating electrode forms at least part of a first filter.

7. The inkjet printing apparatus of claim 6, wherein the inkjet head further includes a guide plate disposed in the filter part.

8. The inkjet printing apparatus of claim 7, wherein the first filter is disposed above the guide plate.

9. The inkjet printing apparatus of claim 7, wherein the first filter is disposed below the guide plate.

10. The inkjet printing apparatus of claim 9, wherein the inkjet head further includes a second filter disposed above the guide plate.

11. The inkjet printing apparatus of claim 1, wherein the electric field generating electrode forms at least part of a guide plate.

12. The inkjet printing apparatus of claim 1, further comprising:

a piezo chamber disposed in the ejection part and connected to each of the plurality of nozzles.

13. The inkjet printing apparatus of claim 1, further comprising:

a voltage applying device that applies an electrical signal to the electric field generating electrode.

14. The inkjet printing apparatus of claim 13, wherein the voltage applying device is driven to induce a flow of ink remaining in the inkjet head.

15. The inkjet printing apparatus of claim 14, wherein the voltage applying device is driven in a non-spray mode of the inkjet head.

16. An inkjet printing apparatus comprising:

a stage on which a target substrate is mounted; and an inkjet head positioned above the stage, wherein the inkjet head includes:

a plurality of nozzles that spray ink containing a plurality of particles, a first electrode filter disposed above the plurality of nozzles and including a plurality of first holes, and a second electrode filter disposed above the first electrode filter and overlapping the first electrode filter in a plan view, the second electrode filter including a plurality of second holes, wherein in a non-s Nay mode of the inkjet head, an electric field is generated between the first electrode filter and the second electrode filter.

17. The inkjet printing apparatus of claim 16, wherein each of a diameter of each of the plurality of first holes and a diameter of each of the plurality of second holes is greater than a length of each of the plurality of particles.

* * * * *